US010814897B2

(12) United States Patent
Choueifati et al.

(10) Patent No.: US 10,814,897 B2
(45) Date of Patent: Oct. 27, 2020

(54) SUPPORT ASSEMBLY WITH MOVABLE LEG

(71) Applicant: Hill Phoenix, Inc., Conyers, GA (US)

(72) Inventors: Jules G. Choueifati, Richmond, VA (US); Sujith Nishal Rasquinha, Bangalore (IN); Akhil Ramesh Hamsagar, Bangalore (IN)

(73) Assignee: Hill Phoenix, Inc., Conyers, GA (US)

( * ) Notice: Subject to any disclaimer, the term of this patent is extended or adjusted under 35 U.S.C. 154(b) by 40 days.

(21) Appl. No.: 15/904,885

(22) Filed: Feb. 26, 2018

(65) Prior Publication Data

US 2019/0263435 A1 Aug. 29, 2019

(51) Int. Cl.
*B62B 3/02* (2006.01)
*B62B 5/00* (2006.01)

(52) U.S. Cl.
CPC .............. *B62B 3/02* (2013.01); *B62B 5/0083* (2013.01); *B62B 2204/04* (2013.01); *B62B 2301/04* (2013.01); *B62B 2301/10* (2013.01)

(58) Field of Classification Search
CPC ....... B62B 5/049; B62B 5/0083; B60B 33/08; B60B 33/0089
USPC .................. 16/19, 24, 26; 188/5; 280/35, 43
See application file for complete search history.

(56) References Cited

U.S. PATENT DOCUMENTS

| | | |
|---|---|---|
| 1,431,634 A | 10/1922 | Clements |
| 1,490,890 A | 4/1924 | Derschug |
| 1,532,064 A | 3/1925 | Neiswender |
| 2,425,675 A | 8/1947 | Graff |
| 2,745,117 A | 5/1956 | Sands |
| 3,432,878 A * | 3/1969 | Hupfer ................ B60B 33/00 16/32 |
| 3,466,697 A | 9/1969 | Goodrich |
| 3,744,083 A | 7/1973 | Jenkins |
| 3,948,538 A * | 4/1976 | Hovila ............... B60B 33/045 280/43.23 |
| 4,077,086 A * | 3/1978 | Butler ............... B60B 33/0089 16/33 |
| 4,108,455 A * | 8/1978 | James ................. B65D 19/42 16/26 |
| 4,576,391 A | 3/1986 | Gerstner |
| 4,696,583 A | 9/1987 | Gorges |

(Continued)

FOREIGN PATENT DOCUMENTS

| | | |
|---|---|---|
| JP | 02-024177 A | 1/1990 |
| JP | 2002-002053 A | 1/2002 |

(Continued)

OTHER PUBLICATIONS

International Search Report dated Apr. 12, 2016 in International Appl. No. PCT/JP2016/000120 with English-language translation (2 pgs.).

*Primary Examiner* — Jeffrey J Restifo
(74) *Attorney, Agent, or Firm* — Foley & Lardner LLP

(57) ABSTRACT

A support assembly includes a body, a first bearing assembly, a first fastener, and a leg. The body includes a first aperture centered on an axis. The first bearing assembly includes a first ball bearing. The first fastener is threadably engaged with the first aperture. The leg is selectively repositionable along the axis. The leg includes a support. The first fastener is configured to cooperate with the leg to cause repositioning of the support relative to the body in response to rotation of the first fastener within the first aperture.

19 Claims, 12 Drawing Sheets

(56) References Cited

U.S. PATENT DOCUMENTS

| | | | |
|---|---|---|---|
| 4,748,715 A * | 6/1988 | Rice | B60B 33/06 16/19 |
| 4,789,121 A * | 12/1988 | Gidseg | F16M 7/00 248/188.2 |
| 4,932,729 A * | 6/1990 | Thompson | A47B 91/002 16/19 |
| 4,955,569 A * | 9/1990 | Hottmann | F16M 7/00 248/188.2 |
| 5,035,445 A * | 7/1991 | Poulin | B60S 9/06 188/5 |
| 5,323,879 A * | 6/1994 | Poulin | B62B 5/049 188/19 |
| 5,366,231 A * | 11/1994 | Hung | A47C 7/006 16/44 |
| 5,423,561 A * | 6/1995 | Sadow | A45C 5/14 190/18 A |
| 5,740,584 A | 4/1998 | Hodge et al. | |
| 5,749,550 A * | 5/1998 | Jackson | A47B 91/022 248/188.2 |
| 5,876,173 A * | 3/1999 | English, Jr. | A47B 91/002 254/8 R |
| 5,903,956 A * | 5/1999 | Theising | B60B 33/06 16/19 |
| 5,971,408 A * | 10/1999 | Mandel | B60B 33/06 248/188.4 |
| 6,109,625 A * | 8/2000 | Hewitt | B60B 33/0007 280/43.24 |
| 6,371,496 B1 * | 4/2002 | Balolia | B60T 1/14 188/19 |
| 6,450,515 B1 | 9/2002 | Guth | |
| 6,457,865 B1 | 10/2002 | Masciarelli, Jr. | |
| 6,591,449 B1 * | 7/2003 | Parkin | B60B 33/0028 16/19 |
| 6,601,806 B2 * | 8/2003 | Wing | B60B 1/006 16/19 |
| 6,637,071 B2 * | 10/2003 | Sorensen | B60B 33/0002 16/19 |
| 6,904,641 B2 * | 6/2005 | Magoto | B60B 33/04 16/19 |
| 7,159,829 B1 | 1/2007 | Finkelstein | |
| 7,163,214 B1 * | 1/2007 | Bratton, Sr. | A63D 15/00 280/79.11 |
| 7,305,737 B2 | 12/2007 | Libakken | |
| 7,578,028 B2 | 8/2009 | Sellars | |
| 7,600,767 B2 * | 10/2009 | Lewis | B62B 5/0083 280/79.11 |
| 7,832,528 B1 * | 11/2010 | Liang | B60T 1/14 188/5 |
| 8,136,201 B2 * | 3/2012 | Yantis | A47B 91/022 16/18 R |
| 8,240,685 B2 * | 8/2012 | Fan | B60B 33/0002 280/79.11 |
| 8,365,353 B2 * | 2/2013 | Block | B60B 33/0068 16/35 R |
| 9,045,153 B2 * | 6/2015 | Cozza | A47B 97/00 |
| 10,123,842 B2 * | 11/2018 | Iceman | B25J 5/007 |
| 10,336,135 B1 * | 7/2019 | Engelbrecht | B60B 33/0007 |
| 2005/0036812 A1 | 2/2005 | Carriere et al. | |
| 2006/0143862 A1 | 7/2006 | Dominic et al. | |
| 2008/0172829 A1 | 7/2008 | White | |
| 2009/0056070 A1 | 3/2009 | James | |
| 2016/0278543 A1 | 9/2016 | Choueifati | |

FOREIGN PATENT DOCUMENTS

| | | |
|---|---|---|
| JP | 2003-011454 A | 1/2003 |
| JP | 2007-502221 A | 2/2007 |

\* cited by examiner

SUPPORT ASSEMBLY WITH MOVABLE LEG

BACKGROUND

The present application relates generally to a support assembly. In particular, this application relates to a support assembly with a movable leg.

Generally speaking, support assemblies may support a structure on a surface. Often times, these support assemblies include wheels, such as casters, that include a lock to selectively resist motion of an associated support assembly with respect to the surface. In these arrangements, the wheels support the load of the structure on the surface. Over time, the locks may become worn, thereby decreasing the resistance provided by the lock to motion of the support assembly with respect to the surface. As a result, unintended movement of the structure may occur. Additionally, the wheels typically represent a significant portion of the financial cost of the support assemblies.

SUMMARY

One embodiment of the present disclosure is related to a support assembly. The support assembly includes a body, an insert, a plate, a first bearing assembly, a first fastener, and a leg. The body defines a first aperture and comprising a plate mount. The insert is positioned within the first aperture and defining a second aperture. The plate is coupled to the plate mount. The plate defines a third aperture aligned with the second aperture and a fourth aperture. The first bearing assembly is configured to be received in the fourth aperture. The first fastener is threadably engaged with the second aperture. The leg is selectively repositionable within the third aperture. The leg includes a fifth aperture and a support. The first fastener is configured to be positioned within the second aperture to threadably engage with the fourth aperture such that rotation of the first fastener causes repositioning of the leg within the third aperture.

Another embodiment of the present disclosure is related to a support assembly. The support assembly includes a body, a first bearing assembly, a first fastener, and a leg. The body defines a first aperture, a second aperture aligned with the first aperture, and a first sleeve. The first bearing assembly is coupled to the body within the first sleeve. The first bearing assembly includes a first ball bearing extending from the body a first distance. The first fastener is threadably engaged with the first aperture. The leg is selectively repositionable within the second aperture. The leg includes a support. The first fastener is configured to be positioned within the first aperture to contact the leg such that the support extends from the body a second distance greater than the first distance.

Yet another embodiment of the present disclosure is related to a support assembly. The support assembly includes a body, a first bearing assembly, a first fastener, and a leg. The body includes a first aperture centered on an axis. The first bearing assembly includes a first ball bearing. The first fastener is threadably engaged with the first aperture. The leg is selectively repositionable along the axis. The leg includes a support. The first fastener is configured to cooperate with the leg to cause repositioning of the support relative to the body in response to rotation of the first fastener within the first aperture.

It is to be understood that both the foregoing general description and the following detailed description are exemplary and explanatory only and are not restrictive of the invention as claimed.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

I. Overview

Currently, a structure, such as a refrigerated case, may include wheels on a bottom surface to facilitate moving of the structure. These wheels may include locks to resist movement of the structure once the structure has been moved into a desired location. In some applications, these locks may become worn or become unintentionally disengaged and the resistance to movement of the structure may decrease, thereby unintentionally facilitating movement of the structure. Further, the wheels and locks may be relatively expensive. Alternatively, a structure may include stationary legs or posts upon which the structure may rest. These legs may not facilitate movement of the structure but instead function merely to support the structure off the ground. However, such an arrangement is undesirable because movement of the structure is relatively difficult.

An opportunity for providing support to a structure with an assembly that selectively facilitates movement of the structure and that is relatively impervious to the same degradation of current wheel and lock assemblies would be advantageous. The embodiments described herein are directed to a support assembly that includes at least one movable bearing assembly and a leg that is selectively repositionable by repositioning a fastener with respect to a body of the support assembly such that at least one ball bearing is brought into contact with a surface, and thereby facilitates movement of a structure coupled to the support assembly, or such that the at least one ball bearing is brought out of contact with a surface, and thereby does not facilitate movement of the structure. The embodiments described herein also describe a coupling assembly coupled to the support assembly that facilitates the selective coupling of a rail assembly to the support assembly to facilitate movement of the structure using casters, as opposed to the ball bearings. In this way, the support assembly can be configured to facilitate movement using the casters (e.g., for movement during manufacturing or assembly of the structure, etc.) or using the ball bearings (e.g., for alignment of the structure in a final installation procedure, etc.) or to not facilitate movement of the structure (e.g., non-movable placement at a usage destination, etc.).

II. Application of the Support Assembly

Figure 1:
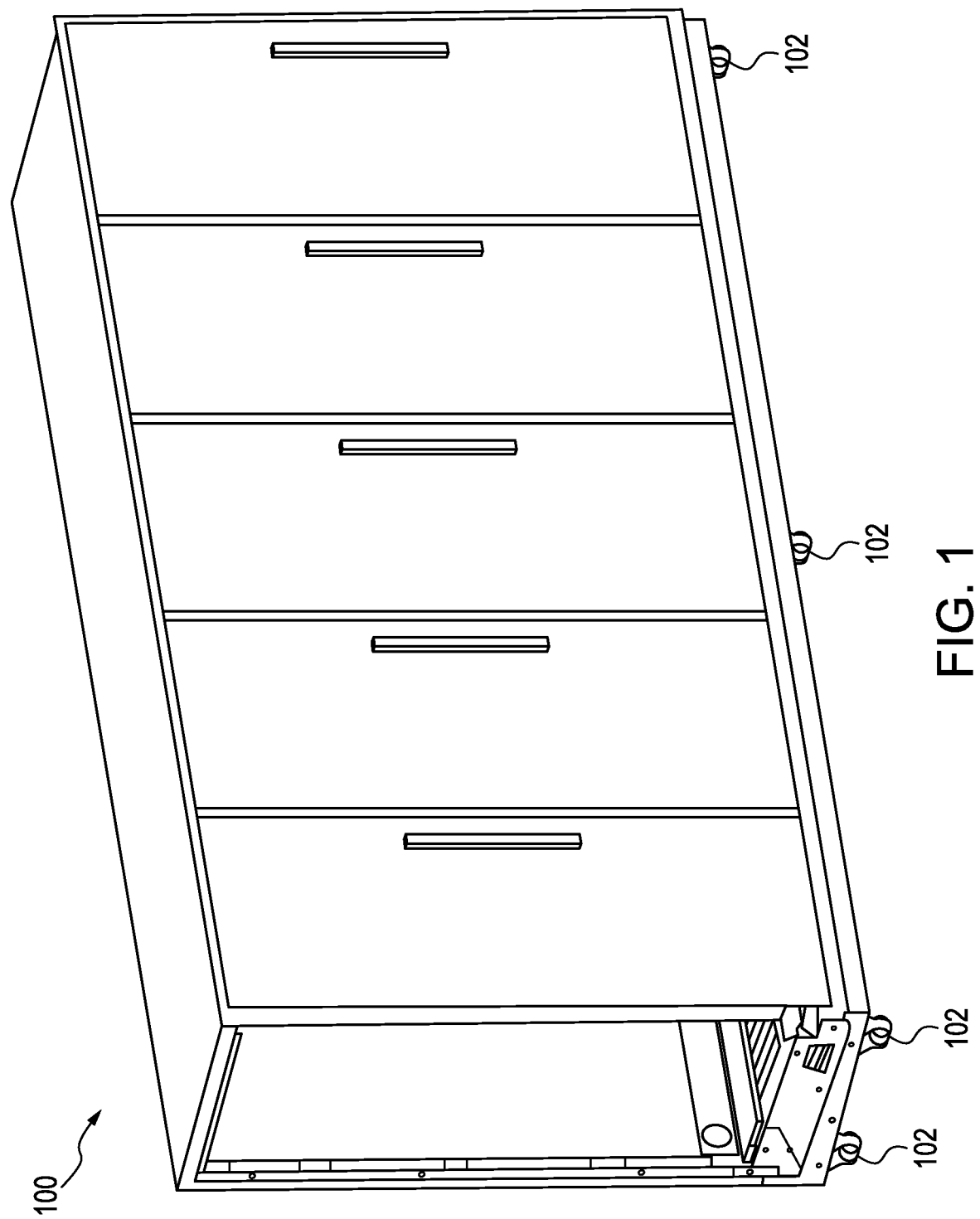
FIG. 1 is a top perspective view of a refrigerated case incorporating a plurality of support assemblies, according to an exemplary embodiment of the present disclosure.
Figure 2:
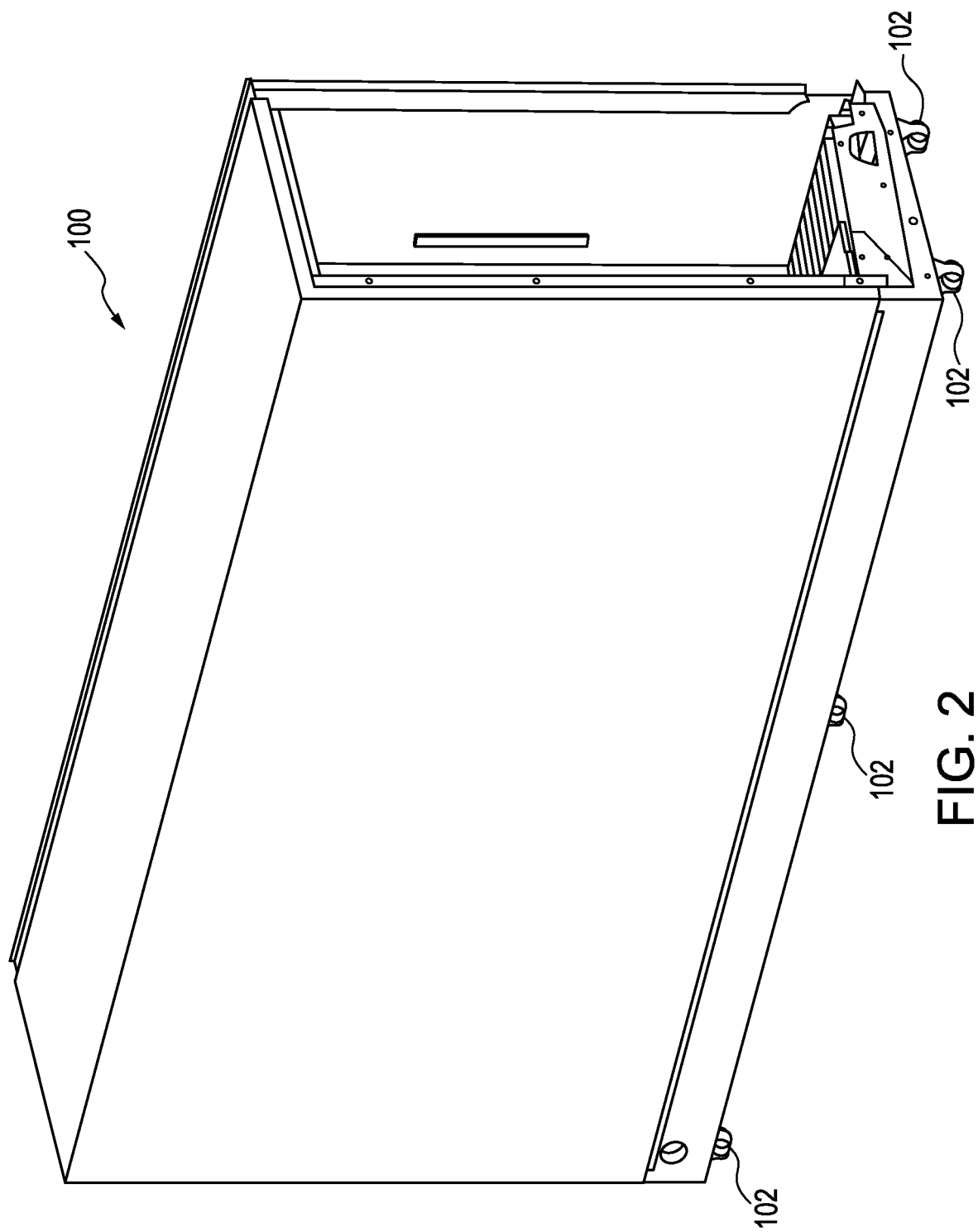
FIG. 2 is a rear perspective view of the refrigerated case shown in FIG. 1.
Figure 3:
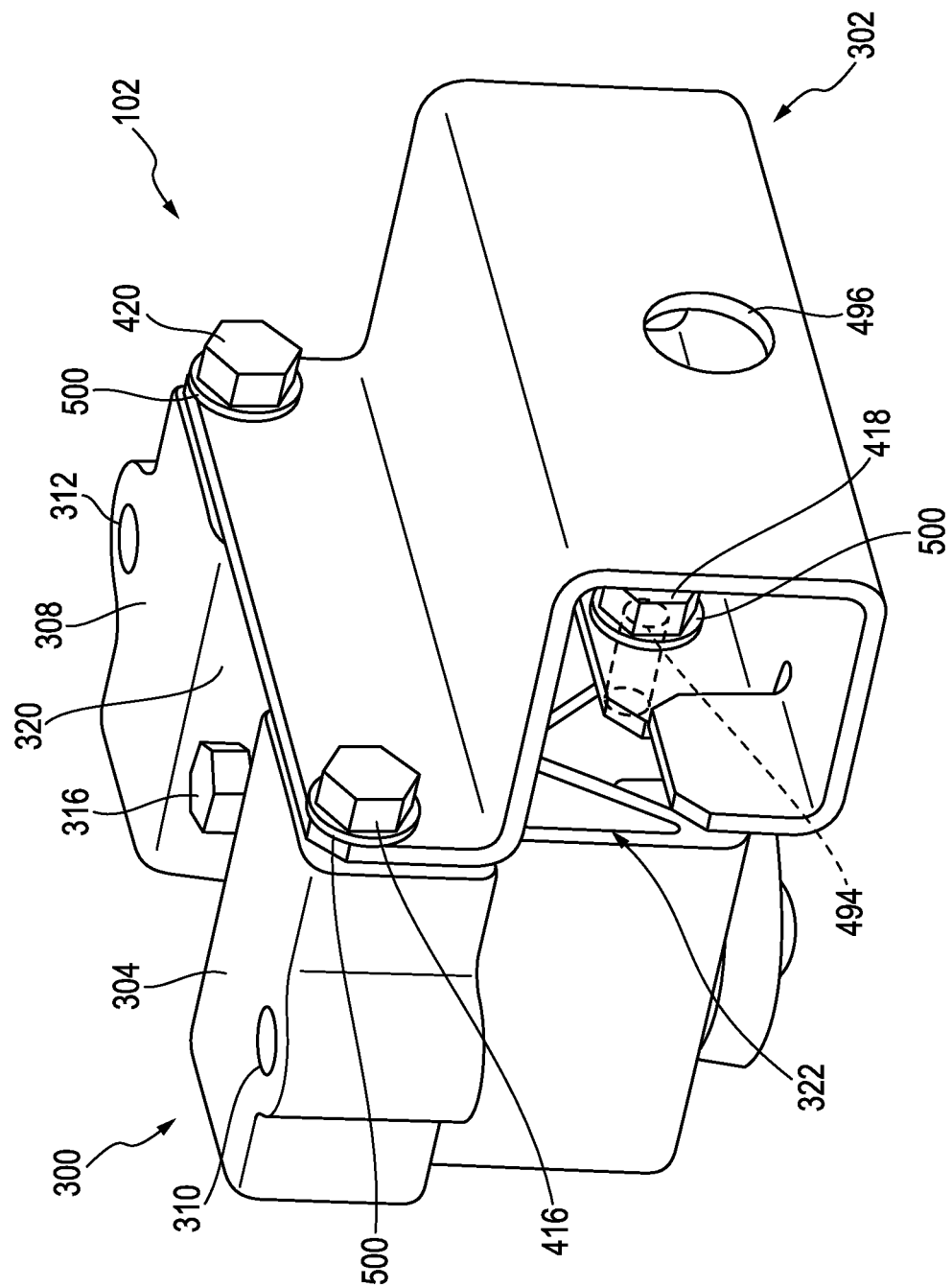
FIG. 3 is a top front perspective view of a support assembly, such as the support assemblies shown in FIG. 1.

Referring to FIGS. 1 and 2, a structure, shown as a refrigerated case (e.g., freezer case, display case, refrigerated display case, etc.) 100 is illustrated. The refrigerated case 100 is used in the storage of goods (e.g., refrigerated goods, frozen goods, foods, beverages, etc.). For example, the refrigerated case 100 may be utilized in the storage of frozen foods in a supermarket. The refrigerated case 100 may include a plurality of doors and shelves, the doors openable to facilitate access to goods supported on the shelves. The refrigerated case 100 may be modular such that a plurality of the refrigerated cases 100 can be aligned and interconnected to form a continuous row of the refrigerated cases 100. In this way, the refrigerated case 100 can be adapted to suit the requirements of a target application. While not shown, it is understood that the refrigerated case 100 includes any and all necessary refrigeration infrastructure including, but not limited to, a condenser, an evaporator, a pump, an accumulator, a fan, coolant lines, a coolant tank, and other similar components.

The refrigerated case 100 also includes a plurality of supports (e.g., legs, bases, stands, etc.), shown as support assemblies 102. The support assemblies 102 are configured to support the refrigerated case 100 on a surface (e.g., floor, ground, etc.). The refrigerated case 100 may define a load (e.g., a force due to gravity, etc.) that is transferred to the surface through the support assemblies 102. The support assemblies 102 are configured to cooperatively bear the load of the refrigerated case 100, even when the refrigerated case 100 is fully loaded with goods. The support assemblies 102 are positioned along the refrigerated case 100 such that the load of the refrigerated case 100 is evenly distributed amongst the support assemblies 102.

As shown in FIGS. 1 and 2, the support assemblies 102 are arranged along a perimeter of a bottom side of the refrigerated case 100. Specifically, four of the support assemblies 102 are arranged at corners of the perimeter of the bottom side of the refrigerated case 100. Additionally, two of the support assemblies 102 are shown as arranged at midpoints of two parallel sides of the perimeter of the bottom side of the refrigerated case 100. The refrigerated case 100 may be supported by additional or fewer of the support assemblies 102 depending on the application of the refrigerated case 100.

III. The Support Assembly According to a First Embodiment

FIGS. 3-8 illustrate the support assembly 102 in greater detail, according to a first embodiment. The support assembly 102 includes a structure (e.g., base, etc.), shown as a body 300, and an assembly (e.g., system, mechanism, etc.), shown as a coupling assembly (e.g., sleeve, etc.) 302. The body 300 includes a first surface (e.g., side, face, etc.), shown as a top surface 304, a second surface, shown as a top surface 306, and a third surface, shown as a top surface 308. The top surface 304 and the top surface 308 are generally disposed along a first plane. The top surface 306 is disposed along a second plane parallel to, and offset from, the first plane such that the top surface 306 is inset relative to the top surface 304 and the top surface 308. The body 300 may be cast (e.g., die cast, etc.) from, for example, aluminum or a composite material (e.g., polymeric material, resin-based material, etc.).

The top surface 304 includes an aperture (e.g., opening, hole, recess, etc.), shown as an aperture 310, and the top surface 308 includes an aperture, shown as an aperture 312. The aperture 310 is configured to receive (e.g., structured to receive, capable of receiving, etc.) a fastener (e.g., bolt, screw, threaded fastener, etc.), shown as a fastener 311. Similarly, the aperture 312 is configured to receive a fastener, shown as a fastener 313. The fastener 311 and the fastener 313 couple (e.g., attach, connect, etc.) each of the top surface 304 and the top surface 308, and therefore the body 300 and the support assembly 102, to a structure, such as the refrigerated case 100 shown in FIGS. 1 and 2. For example, the fastener 311 and the fastener 313 may couple the support assembly 102 to a portion of the perimeter of the bottom side of the refrigerated case 100.

The top surface 306 also includes an aperture, shown as an aperture 314, that is configured to receive a fastener, shown as a fastener 316. As opposed to the aperture 310 and the aperture 312, which cooperate with the fastener 311 and the fastener 313 to couple the support assembly 102 to a structure, such as the refrigerated case 100, the aperture 314 and the fastener 316 do not cooperate to couple the support assembly 102 to the structure. Instead, the aperture 314 and the fastener 316 cooperate to adjust the support assembly 102 to selectively bring at least one ball bearing into contact with a surface. The aperture 314 is defined by an axis, shown as a central axis 317.

In an exemplary embodiment, the aperture 314 is centered on the top surface 306 such that the body 300 is symmetrical about a first plane bisecting the aperture 314 and a second plane bisecting the aperture 314 and orthogonal to the first plane. The offset of the plane along which the top surface 306 disposed from the plane along which the top surface 304 and the top surface 308 are disposed may be based on, for example, a thickness of a head of the fastener 316.

The body 300 also includes a fourth surface, shown as a curved surface 318, and a fifth surface, shown as a curved surface 320. The curved surface 318 is contiguous with both the top surface 304 and the top surface 306, such that the curved surface 318 is downward sloping from the top surface 304 to the top surface 306. Similarly, the curved surface 320 is contiguous with both the top surface 308 and the top surface 306, such that the curved surface 320 is downward sloping from the top surface 308 to the top surface 306.

The body 300 also includes a first side (e.g., face, surface, etc.), shown as a first side 400, and a second side, shown as a second side 402, opposite the first side 400. In an exemplary embodiment, the first side 400 and the second side 402, when the support assembly 102 is coupled to a structure, are generally orthogonal to a surface upon which the support assembly 102 is supported.

The first side 400 includes a first opening, shown as an opening 404, a second opening, shown as an opening 406, and a third opening, shown as an opening 408. In an exemplary embodiment, the opening 404 of the first side 400 and the opening 408 of the first side 400 are aligned and disposed along a plane parallel to, and offset from, a plane upon which the top surface 306 is disposed and/or a plane along which the top surface 304 and/or the top surface 308 is disposed. The opening 406 of the first side 400 may be centered on the first side 400 such that the opening 406 of the first side 400 is equidistant from the opening 404 of the first side 400 and the opening 408 of the first side 400.

Similarly, the second side 402 includes a first opening, shown as an opening 410, a second opening, shown as an opening 412, and a third opening, shown as an opening 414. In an exemplary embodiment, the opening 410 of the second side 402 and the opening 414 of the second side 402 are aligned and disposed along a plane parallel to, and offset from, a plane upon which the top surface 306 is disposed and/or a plane along which the top surface 304 and/or the top surface 308 is disposed. The opening 412 of the second side 402 may be centered on the second side 402 such that the opening 412 of the second side 402 is equidistant from the opening 410 of the second side 402 and the opening 414 of the second side 402.

The opening 404 of the first side 400 receives a first fastener, shown as a fastener 416, the opening 406 of the first side 400 receives a second fastener, shown as a fastener 418, and the opening 408 of the first side 400 receives a third fastener, shown as a fastener 420. The fastener 416, the fastener 418, and the fastener 420 cooperate to secure the coupling assembly 302 to the first side 400, and therefore to the support assembly 102. While not shown, it is understood that the fastener 416, the fastener 418, and the fastener 420 could be received in the opening 410, the opening 412, and the opening 414 of the second side 402 to cooperate to secure the coupling assembly 302 to the second side 402.

The body 300 also includes a first receptacle (e.g., container, etc.), shown as a sleeve 422, and a second receptacle, shown as a sleeve 424. The sleeve 422 and the sleeve 424 are positioned between the top surface 304, the top surface 306, the top surface 308, the first side 400, and the second side 402 of the body 300.

The sleeve 422 defines an aperture, shown as an opening 426. In some embodiments, the opening 426 is machined into the body 300 (e.g., via a milling operation, etc.). The opening 426 is defined by an axis, shown as a central axis 428. According to some embodiments, the central axis 428 of the opening 426 is orthogonal to a plane upon which the top surface 304 is disposed, a plane upon which the top surface 306 is disposed, and/or a plane upon which the top surface 308 is disposed. In an exemplary embodiment, the central axis 428 of the opening 426 is parallel to the central axis 317 of the aperture 314.

The sleeve 424 defines an aperture, shown as an opening 430. In some embodiments, the opening 430 is machined into the body 300 (e.g., via a milling operation, etc.). The opening 430 is defined by an axis, shown as a central axis 432. According to some embodiments, the central axis 432 of the opening 430 is orthogonal to a plane upon which the top surface 304 is disposed, a plane upon which the top surface 306 is disposed, and/or a plane upon which the top surface 308 is disposed. In an exemplary embodiment, the central axis 432 of the opening 430 is parallel to the central axis 317 of the aperture 314 and/or the central axis 428 of the opening 426.

The support assembly 102 also includes a first assembly (e.g., ball transfer, ball bearing caster, etc.), shown as a bearing assembly 434, and a second assembly (e.g., ball transfer, ball bearing caster, etc.), shown as a bearing assembly 436. The bearing assembly 434 and the bearing assembly 436 are coupled to the body 300 and cooperate with the body 300 to provide a support from the support assembly 102 to a structure that is coupled to the support assembly 102.

The bearing assembly 434 includes a housing (e.g., cylinder, etc.), shown as a housing 438. The housing 438 of the bearing assembly 434 includes a shoulder, shown as a shoulder 440. The shoulder 440 segments the housing 438 into a first portion, shown as an exterior portion 442, and a second portion, shown as an interior portion 444. The shoulder 440 is contiguous with both the exterior portion 442 and the interior portion 444. The housing 438 of the bearing assembly 434 is configured such that the interior portion 444 is received in, and coupled to, the sleeve 422 while the shoulder 440 abuts, or is adjacent to, a surface, shown as a bottom surface 446, of the body 300 and the exterior portion 442 protrudes from the body 300. For example, the interior portion 444 of the bearing assembly 434 may be coupled to the sleeve 422 through the use of adhesive or the interior portion 444 of the bearing assembly 434 may be friction fit (e.g., press fit, etc.) within the sleeve 422. In another example, the interior portion 444 of the bearing assembly 434 is threaded into the sleeve 422 through the use of a threaded interface on the interior portion 444 of the bearing assembly 434 and a corresponding threaded interface within the sleeve 422. The housing 438 of the bearing assembly 434 may be configured such that the exterior portion 442 of the bearing assembly 434 and the interior portion 444 of the bearing assembly 434 are structurally integrated (e.g., through a milling or machining operation, etc.). In some applications, the housing 438 of the bearing assembly 434 is configured such that the exterior portion 442 of the bearing assembly 434 and the interior portion 444 of the bearing assembly 434 are separate components that are joined (e.g., through a threaded interface, through a welding operation, etc.).

The bearing assembly 434 also includes a bearing, shown as a ball bearing 448, and a structure, shown as a socket 450. The ball bearing 448 of the bearing assembly 434 is positioned, in part, within the housing 438 of the bearing assembly 434 and partially extends from the housing 438 of the bearing assembly 434. The ball bearing 448 of the bearing assembly 434 is positioned, in part, within the socket 450 of the bearing assembly 434. In an exemplary embodiment, the socket 450 of the bearing assembly 434 is partially defined by (e.g., contained within, positioned within, etc.) the exterior portion 442 of the bearing assembly 434 and the interior portion 444 of the bearing assembly 434. In other embodiments, the socket 450 of the bearing assembly 434 is only defined by the exterior portion 442 of the bearing assembly 434 and not by the interior portion 444 of the bearing assembly 434. The ball bearing 448 of the bearing assembly 434 may be constructed from, for example, carbon steel or nylon. While not shown, it is understood that the housing 438 of the bearing assembly 434 may include an insert that is press fit into the exterior portion 442 of the bearing assembly 434 to form the socket 450 of the bearing assembly 434.

Similarly, the bearing assembly 436 includes a housing, shown as a housing 452. The housing 452 of the bearing assembly 436 includes a shoulder, shown as a shoulder 454. The shoulder 454 segments the housing 452 into a first portion, shown as an exterior portion 456, and a second portion, shown as an interior portion 458. The shoulder 454 is contiguous with both the exterior portion 456 and the interior portion 458. The housing 452 of the bearing assembly 436 is configured such that the interior portion 458 is received in, and coupled to, the sleeve 424 while the shoulder 454 abuts, or is adjacent to, the bottom surface 446 of the body 300 and the exterior portion 456 protrudes from the body 300. For example, the interior portion 458 of the bearing assembly 436 may be coupled to the sleeve 424 through the use of adhesive or the interior portion 458 of the bearing assembly 436 may be friction fit (e.g., press fit, etc.) within the sleeve 424. In another example, the interior portion 458 of the bearing assembly 436 is threaded into the sleeve 424 through the use of a threaded interface on the interior portion 458 of the bearing assembly 436 and a corresponding threaded interface within the sleeve 424. The housing 452 of the bearing assembly 436 may be configured such that the exterior portion 456 of the bearing assembly 436 and the interior portion 458 of the bearing assembly 436 are structurally integrated (e.g., through a milling or machining operation, etc.). In some applications, the housing 452 of the bearing assembly 436 is configured such that the exterior portion 456 of the bearing assembly 436 and the interior portion 458 of the bearing assembly 436 are separate components that are joined (e.g., through a threaded interface, through a welding operation, etc.).

The bearing assembly 436 also includes a bearing, shown as a ball bearing 460, and a structure, shown as a socket 462. The ball bearing 460 of the bearing assembly 436 is positioned, in part, within the housing 452 of the bearing assembly 436 and partially extends from the housing 452 of the bearing assembly 436. The ball bearing 460 of the bearing assembly 436 is positioned, in part, within the socket 462 of the bearing assembly 436. In an exemplary embodiment, the socket 462 of the bearing assembly 436 is partially defined by (e.g., contained within, positioned within, etc.) the exterior portion 456 of the bearing assembly 436 and the interior portion 458 of the bearing assembly 436. In other embodiments, the socket 462 of the bearing assembly 436 is only defined by the exterior portion 456 of the bearing assembly 436 and not by the interior portion 458 of the bearing assembly 436. The ball bearing 460 of the bearing assembly 436 may be constructed from, for example, carbon steel or nylon. While not shown, it is understood that the housing 452 of the bearing assembly 436 may include an insert that is press fit into the exterior portion 456 of the bearing assembly 436 to form the socket 462 of the bearing assembly 436.

The support assembly 102 also includes a member (e.g., piston, stand, etc.), shown as a leg 464. The leg 464 is configured to selectively support the support assembly 102, and therefore support a structure that is coupled to the support assembly 102. The leg 464 is selectively repositionable (e.g., translatable, etc.) within an aperture, shown as an aperture 466, that is contiguous with, and extends to, the aperture 314. In some embodiments, the aperture 314 is partially formed from an internally threaded insert that is positioned within, and coupled to, the aperture 466.

The leg 464 is not threadably engaged with the aperture 466 while the fastener 316 is threadably engaged with the aperture 314. In operation, the fastener 316 is threaded into the aperture 314 such that the fastener 316 contacts a face (e.g., surface, side, etc.), shown as a top face 468, of the leg 464. In this way, the leg 464 may be selectively repositioned within the aperture 466 by rotating the fastener 316 within the aperture 314.

The leg 464 includes a portion (e.g., flange, etc.), shown as a support 470, that is configured to selectively interface with a surface upon which the support assembly 102 is supported. The support 470 is positioned between the bottom surface 446 of the body 300 and the surface upon which the support assembly 102 is supported. The support 470 is contiguous with a portion (e.g., section, etc.), shown as a bottom portion 472, of the leg 464. In some embodiments, the support 470 has a diameter greater than a diameter of the bottom portion 472. In other embodiments, the support 470 does not have a diameter greater than a diameter of the bottom portion 472. For example, the support 470 may have a diameter equal to the diameter of the bottom portion 472. In other examples, the support 470 may have a diameter less than a diameter of the bottom portion 472.

The ball bearing 448 of the bearing assembly 434 and the ball bearing 460 of the bearing assembly 436 extend a first distance from the body 300 (e.g., from the bottom surface 446 of the body 300, etc.). For example, the ball bearing 448 of the bearing assembly 434 and the ball bearing 460 of the bearing assembly 436 may extend one inch from the bottom surface 446 of the body 300. Similarly, the support 470 is configured to extend a second distance from the body 300 (e.g., from the bottom surface 446 of the body 300, etc.). For example, the support 470 may selectively extend 1.25 inches from the bottom surface 446 of the body 300.

The leg 464 also includes another portion (e.g. ring, etc.), shown as a flange 474. The flange 474 is contiguous with the bottom portion 472 of the leg 464 and a second portion (e.g., section, etc.), shown as a top portion 476, of the leg 464. The flange 474 is configured to limit movement of the leg 464 within the aperture 466 to retain the leg 464 when, for example, the support assembly 102 is elevated from a surface upon which the support assembly 102 is supported. The support assembly 102 also includes a seal (e.g., o-ring, etc.), shown as a seal 478, positioned between the top portion 476 of the leg 464 and the aperture 466. The seal 478 functions to resist movement of the leg 464 within the aperture 466.

The support assembly 102 also includes a bracket, shown as a bracket 480. The bracket 480 is coupled to the body 300 via a fastener, shown as a fastener 482, and a washer (e.g., spacers, bushings, etc.), shown as a washer 484. The bracket 480 includes an aperture, shown as an aperture 486, that is configured to receive the fastener 482. The bracket 480 is coupled to one of the first side 400 and the second side 402 of the body 300 and the coupling assembly 302 is coupled to the other of the first side 400 and the second side 402 of the body 300. In an exemplary embodiment, the fastener 482 is threadably engaged with the opening 412 of the second side 402 to couple the bracket 480 to the second side 402 of the body 300. In other embodiments, the fastener 482 is threadably engaged with the opening 406 of the first side 400 to couple the bracket 480 to the first side 400 of the body 300.

The bracket 480 is an L-bracket (e.g., ninety-degree bracket, right angle bracket, etc.) and includes a first portion having the aperture 486 and a second portion contiguous with the first portion an having an opening, shown as an opening 488. The opening 488 is configured to receive the top portion 476 of the leg 464. The opening 488 facilitates movement of the leg 464 relative to the body 300 but functions to limit such movement through contact between the bracket 480 and the flange 474. In this way, the bracket 480 may retain the leg 464 relative to the body 300 when the support 470 is not supporting the support assembly 102 on a surface, such as when a structure to which the support assembly 102 is coupled is lifted off the ground (e.g., by a forklift, etc.) and when the support assembly 102 is being stored on a shelf (e.g., prior to installation on a structure, etc.). In various embodiments, the flange 474 is spaced from the support 470 such that the bracket 480 does not contact the bearing assembly 434 or the bearing assembly 436. In other embodiments, the flange 474 is spaced from the support 470 such that the bracket 480 interfaces with the bearing assembly 434 and/or the bearing assembly 436.

The coupling assembly 302 includes a bracket (e.g., a coupler, etc.), shown as a bracket 490, that is configured to be selectively coupled to the body 300. The bracket 490 is coupled to the body 300 through the use of the fastener 416, the fastener 418, and the fastener 420. The bracket 490 includes a first aperture, shown as an first hole 492, configured to receive the fastener 416, a second aperture, shown as an second hole 494, configured to receive the fastener 418, a third aperture, shown as a third hole 496, also configured to receive the fastener 418, and a fourth aperture, shown as an fourth hole 498, configured to receive the fastener 420. In an exemplary embodiment, the first hole 492 is configured to be aligned with the opening 404 in the first side 400 of the body 300, the second hole 494 is configured to be aligned with the opening 406 in the first side 400 of the body 300, and the fourth hole 498 is configured to be aligned with the opening 408 in the first side 400 of the body 300. In other embodiments, the first hole 492 is configured to be aligned with the opening 414 in the second side 402 of the body 300, the second hole 494 is configured to be aligned with the opening 412 in the second side 402 of the body 300, and the fourth hole 498 is configured to be aligned with the opening 410 in the second side 402 of the body 300.

The third hole 496 is configured to facilitate movement of the fastener 418 completely therethrough. The third hole 496 is aligned with the second hole 494. In this way, the fastener 418 may be inserted through the third hole 496 into the second hole 494. The third hole 496 may receive a tool (e.g., socket, wrench, screwdriver, bit, etc.) configured to rotate the fastener 418 within the second hole 494 such that the fastener 418 is threaded into the opening 406.

The coupling assembly 302 is also shown to include washers (e.g., spacers, bushings, etc.), shown as washers 500, configured to be positioned between the fastener 354 and bracket 490 and between the fastener 356 and the bracket 490. The bracket 490 may be constructed from, for example, grade 8 steel.

Figure 4:
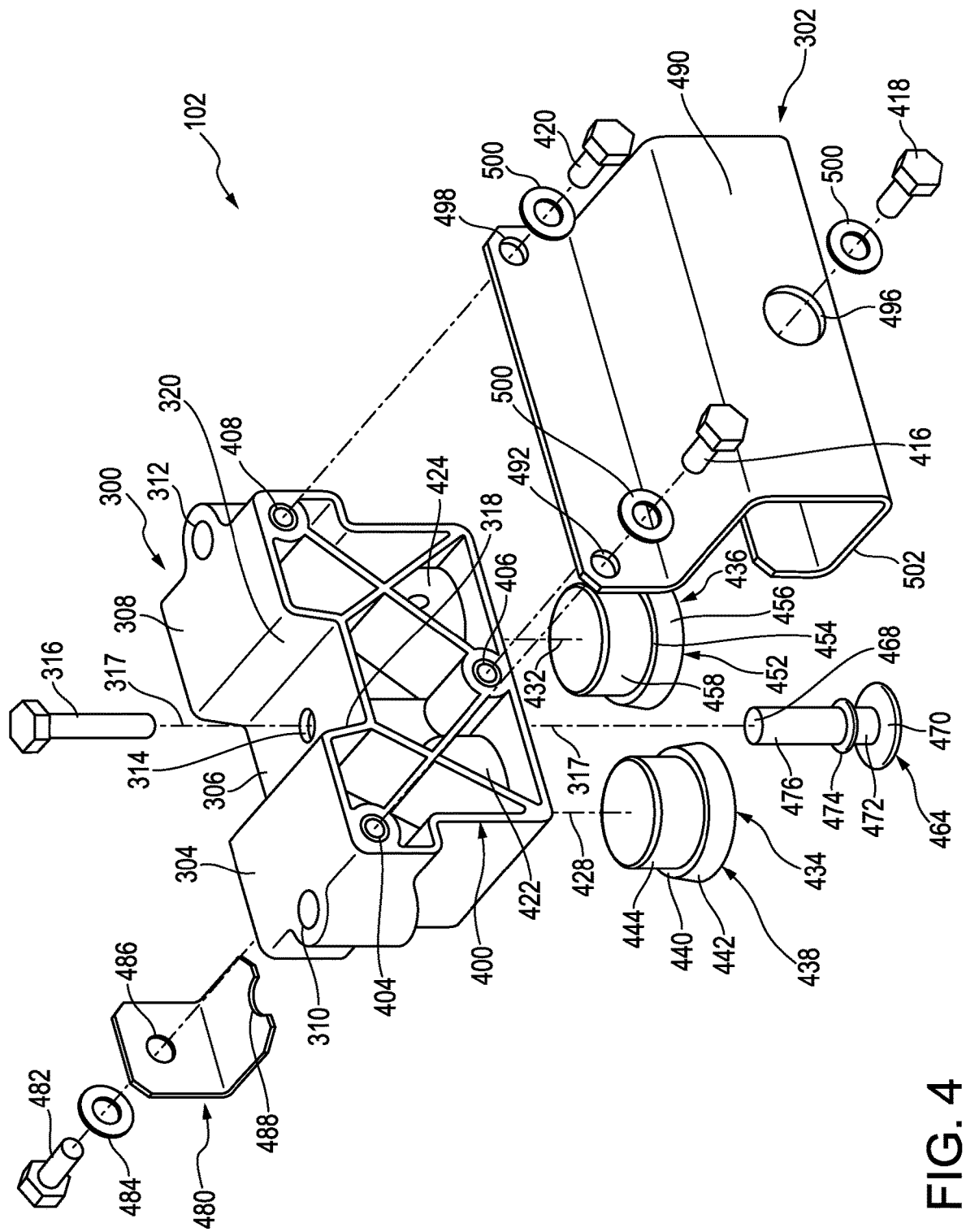
FIG. 4 is an exploded view of the support assembly shown in FIG. 3.
Figure 5:
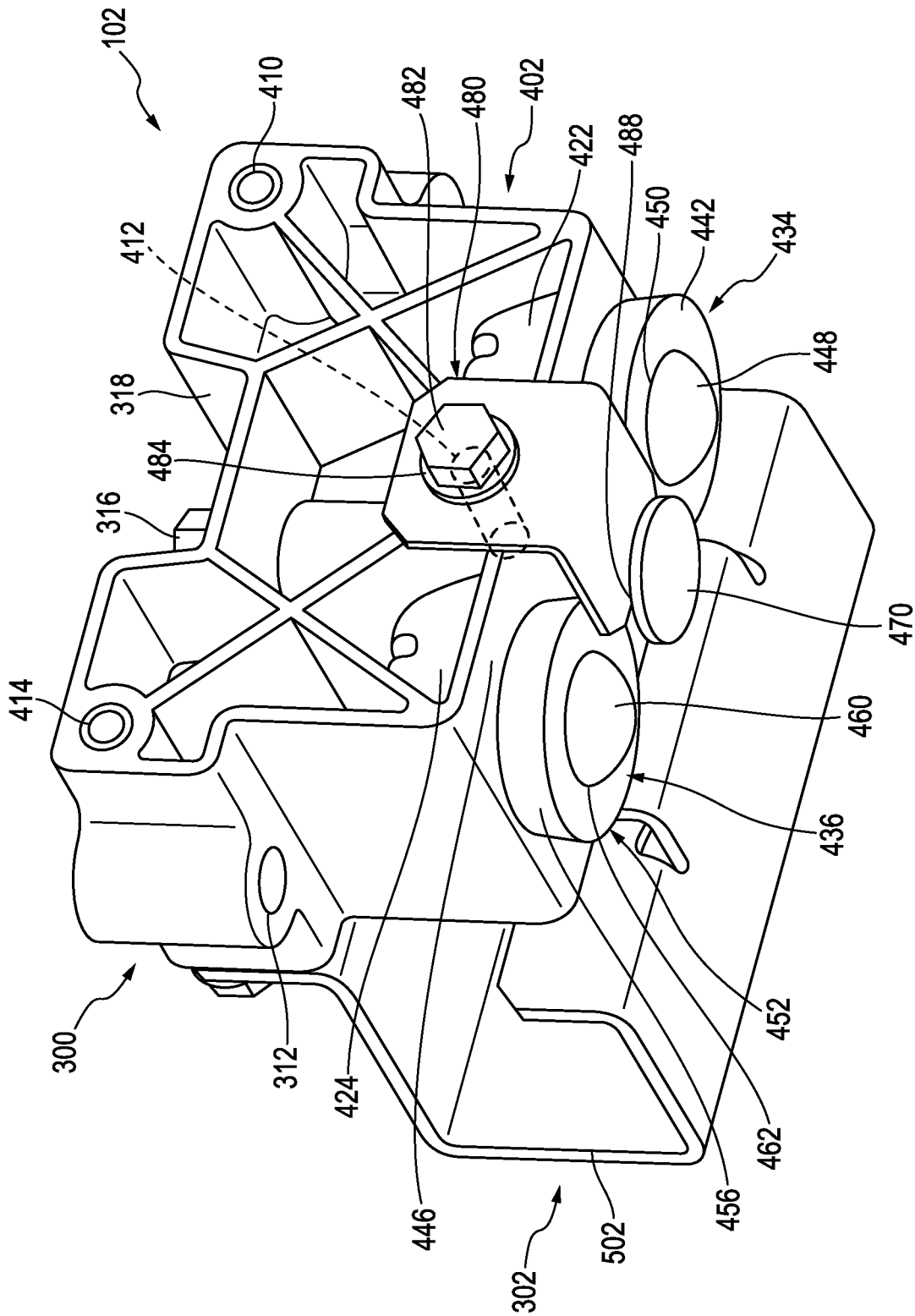
FIG. 5 is a bottom rear perspective view of a support assembly, such as the support assemblies shown in FIG. 1.

The bracket 490 defines an aperture, shown as an opening 502. As will be described in more detail herein, the opening 502 is configured to receive a rail for supporting the support assembly 102 above the surface. The bracket 490 may be variously configured such that the opening 502 has a target configuration. As shown in FIG. 4, the opening 502 is generally square and functions to receive a rail of generally square shape. However, the opening 502 may be rectangular, hexagonal, or otherwise shaped to receive a rail of a different configuration.

To assemble the support assembly 102, the bearing assembly 434 and the bearing assembly 436 are first assembled. In an exemplary embodiment, the bearing assembly 434 is assembled by placing the ball bearing 448 in the interior portion 444 and pressing the exterior portion 442 over the ball bearing 448, thereby sealing the ball bearing 448 in the bearing assembly 434. Similarly, the bearing assembly 436 is assembled by placing the ball bearing 460 in the interior portion 458 and pressing the exterior portion 456 over the ball bearing 460, thereby sealing the ball bearing 460 in the bearing assembly 436, in an exemplary embodiment.

Next, the bearing assembly 434 is inserted into the opening 426 of the body 300, and the bearing assembly 436 is inserted into the opening 430 of the body 300. For example, the bearing assembly 434 may be press-fit into the opening 426 of the body 300 and the bearing assembly 436 may be press-fit into the opening 430 of the body 300. Next, the seal 478 is positioned around the bottom portion 472 of the leg 464, and the bottom portion 472 of the leg 464 is inserted into the aperture 466. The bracket 480 is then installed by inserting the fastener 482 through the washer 484 through the aperture 486 and threading the fastener 482 into the opening 412 on the second side 402 of the body 300. The bracket 480 is secured to the body 300 such that the opening 488 receives the top portion 476 of the leg 464.

The coupling assembly 302 is then attached to the body 300 by aligning the first hole 492, the second hole 494, and the fourth hole 498 on the bracket 490 with the opening 404, the opening 406, and the opening 408 on the first side 400 of the body 300, respectively. Next, the fastener 416 is inserted through the washer 500 and the first hole 492, and threaded into the opening 404 on the first side 400 of the body 300, the fastener 418 is inserted through the washer 500, the third hole 496, and the second hole 494, and threaded into the opening 406 on the first side 400 of the body 300, and the fastener 420 is inserted through the washer 500 and the fourth hole 498, and threaded into the opening 408 on the first side 400 of the body 300. Next, the fastener 316 is inserted into the aperture 314. Then, the leg 464 may be selectively repositioned using the fastener 316.

As a result of these operations, the support assembly 102 has been assembled. The support assembly 102 may then be coupled to the refrigerated case 100 by inserting fasteners through the aperture 310 and the aperture 312 into apertures in the refrigerated case 100. Finally, a rail assembly, as will be further described herein, may then be coupled to the support assembly 102. Other processes for assembling the support assembly 102 are similarly possible.

In an exemplary embodiment, the body 300 is constructed from plastic that is injection molded. In various embodiments, the opening 404, the opening 406, and the opening 408 of the first side 400 and the opening 410, the opening 412, and the opening 414 of the second side 402, the aperture 310, the aperture 312, and/or the aperture 314 are threaded inserts. In various embodiments, the fastener 316, the fastener 416, the fastener 418, the fastener 420, and/or the fastener 482 are constructed from steel (e.g., grade 8.8 steel, etc.). The fastener 416, the fastener 418, and the fastener 420 are ⁵⁄₁₆"–18 inch bolts. In some embodiments, the leg 464 is constructed from steel. In some embodiments, the bracket 490 is constructed from steel. In various embodiments, the bracket 480, the fastener 482, and/or the washer 484 are constructed from steel (e.g., stainless steel, galvanized steel, etc.).

IV. Movement of the Support Assembly According to the First Embodiment

Figure 6:
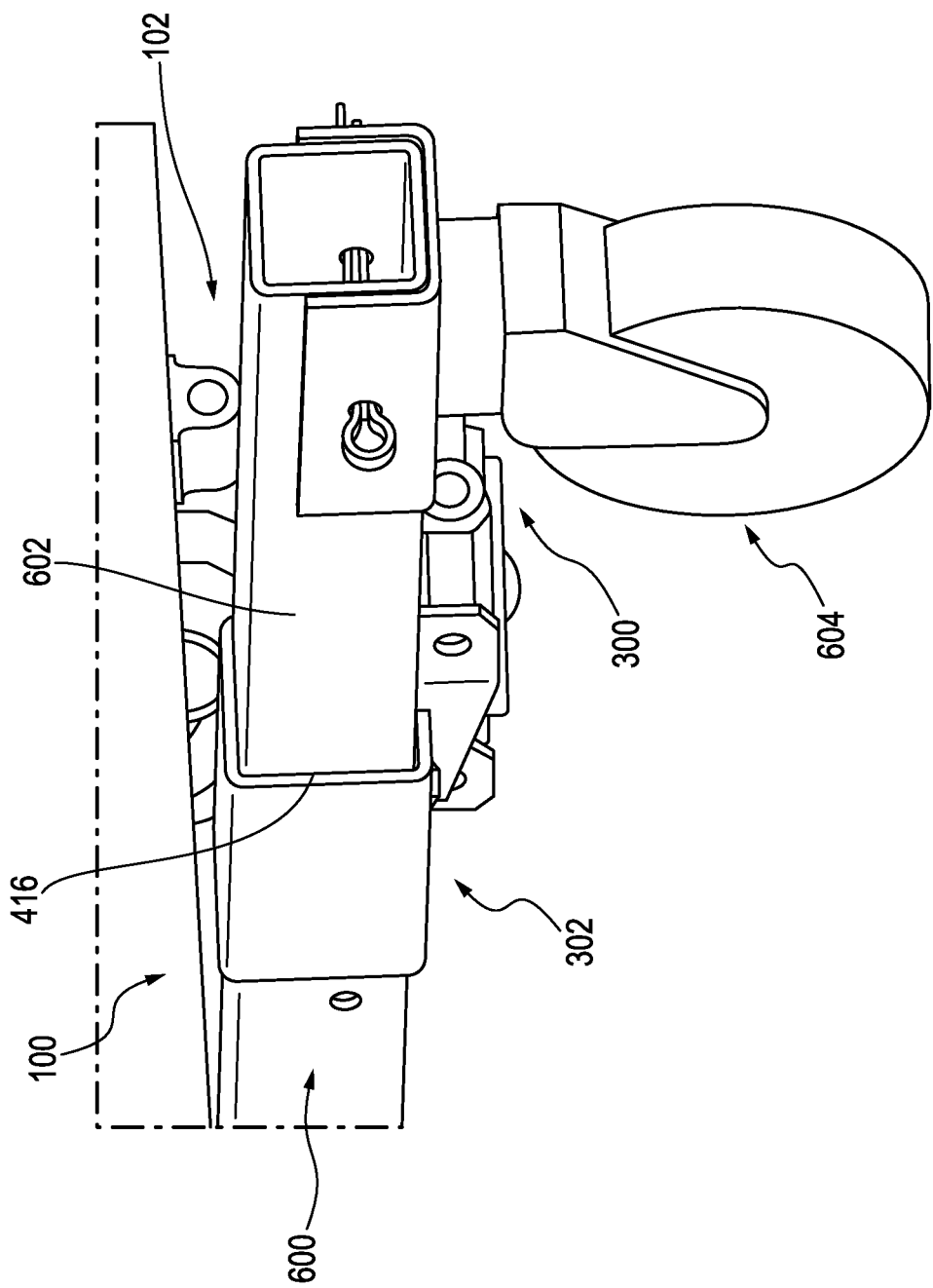
FIG. 6 is a perspective view of a support assembly, such as the support assembly shown in FIG. 3, coupled to a refrigerated case, such as the refrigerated case shown in FIG. 1, and of a rail assembly coupled thereto.
Figure 7:
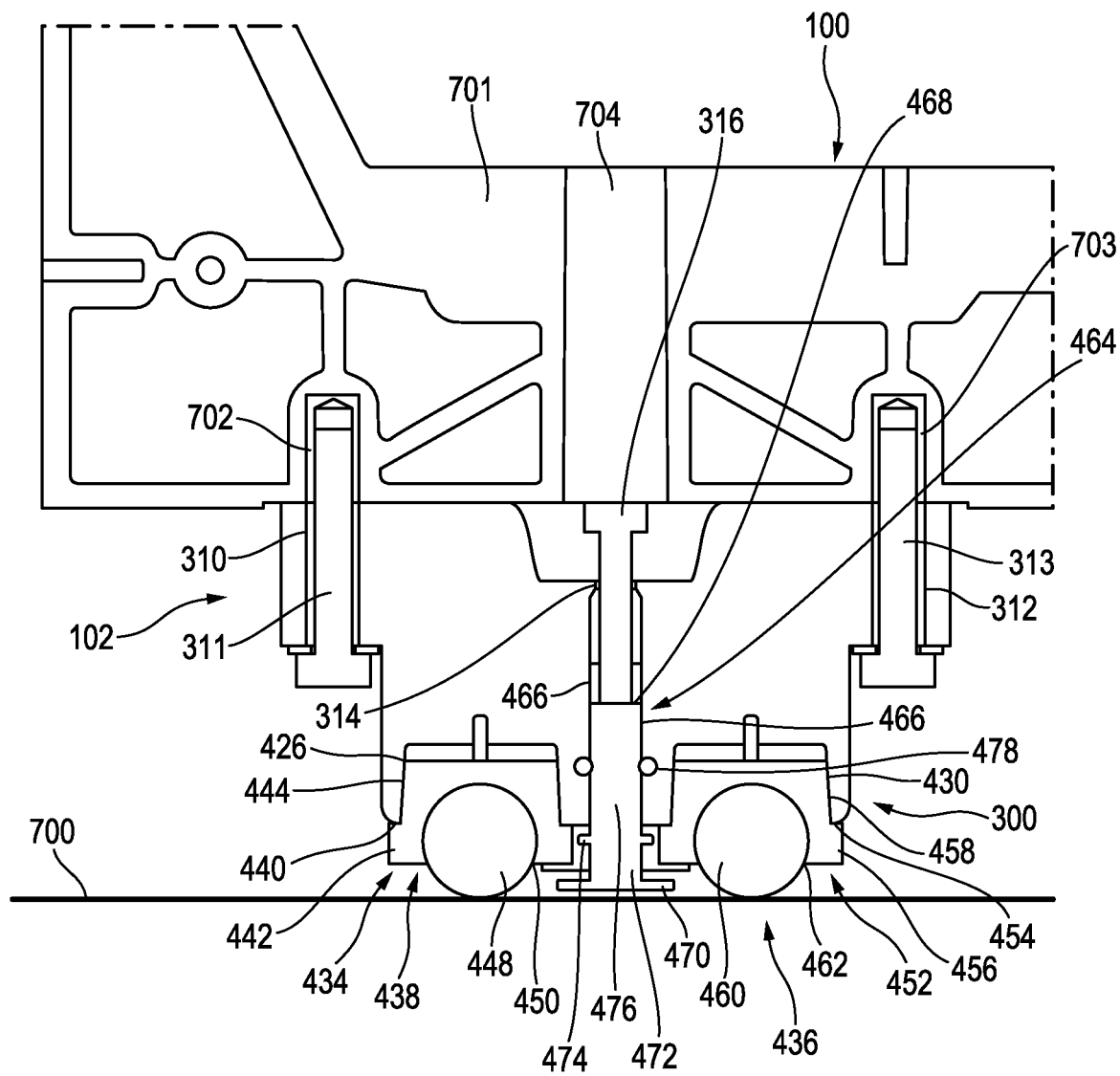
FIG. 7 is a cross-sectional view of a support assembly, such as the support assembly shown in FIG. 3, coupled to a refrigerated case, such as the refrigerated case shown in FIG. 1.
Figure 8:
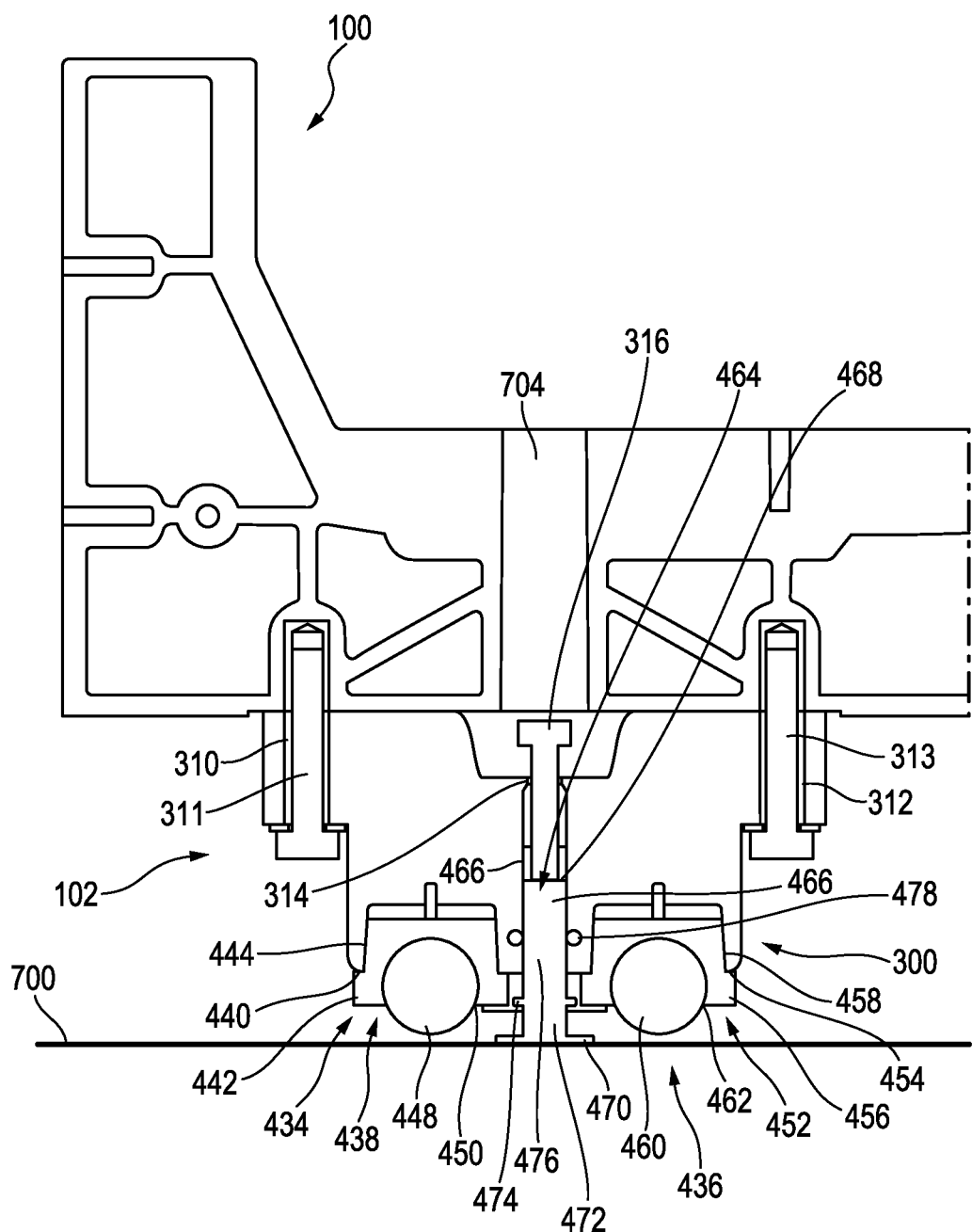
FIG. 8 is another cross-sectional view of a support assembly, such as the support assembly shown in FIG. 3, coupled to a refrigerated case, such as the refrigerated case shown in FIG. 1.

As shown in FIGS. 6-8, the support assembly 102 is mounted to the refrigerated case 100. Additionally, an assembly, shown as a rail assembly 600, is coupled to each of the support assemblies 102 in FIG. 6. Specifically, the rail assembly 600 includes members, shown as rail members 602, that are each positioned within the openings 502 of the coupling assemblies 302 of the support assemblies 102. The rail assembly 600 may include a connecting member positioned between the rail members 602 such that the rail members 602 are selectively repositionable with respect to the connecting member. For example, the connecting member may include a pin, and the rail member 602 may include a detent (e.g., recess, depression, etc.), or a plurality of detents, configured to receive the pin. Through movement of the rail members 602 relative to the connecting member, each of the rail members 602 can be decoupled from the other of the rail members 602 by decoupling the rail member 602 from the connecting member.

The rail assembly 600 also includes two wheels (e.g., movement members, etc.), shown as casters 604. The casters 604 may be rotatable three-hundred and sixty degrees. Each of the casters 604 is coupled to one of the rail members 602. In use, the casters 604 facilitate movement of the refrigerated case 100. For example, the refrigerated case 100 may be moved between manufacturing stations (e.g., between an assembly station and an electrical wiring station, etc.) using the casters 604. The casters 604 may eliminate the need for heavy machinery (e.g., a forklift, a skid loader, etc.) to move the refrigerated case 100. When the rail assembly 600 is coupled to the support assembly 102, the support assembly 102 may not contact the surface upon which the casters 604 move. When the rail assembly 600 is decoupled from the support assembly 102, a portion of the support assembly 102 contacts the surface.

Through the use of the rail assembly 600, assembly and installation of the refrigerated case 100, or any other structure utilizing the support assemblies 102, may be substantially less expensive. In some applications, the rail assembly 600 is utilized only in manufacturing of the refrigerated case 100 and is removed prior to shipping the refrigerated case 100 to a customer for installation. In these applications, the rail assembly 600 can be reused for assembly of other refrigerated cases 100. By being able to reuse the rail assembly 600, the support assemblies 102 are significantly less expensive than structures utilizing similar wheels.

The support assembly 102 is operable between a first position and a second position. In the first position, the ball bearing 448 of the bearing assembly 434 and the ball bearing 460 of the bearing assembly 436 each contact a surface upon which the support assembly 102 is resting such that the support assembly 102 may be easily moved with respect to the surface upon which the support assembly 102 is resting. In the second position, the ball bearing 448 of the bearing assembly 434 and the ball bearing 460 of the bearing assembly 436 each do not contact a surface upon which the support assembly 102 is resting such that the support assembly 102 may not be easily moved with respect to the surface upon which the support assembly 102 is resting.

In the first position, the fastener 316 is positioned within the aperture 314 such that the leg 464 is not biased against the surface upon which the support assembly 102 is resting and the support 470 is separated from the surface upon which the support assembly 102 is resting. In various applications, the support assembly 102 is in the first position when the rail assembly 600 is decoupled from the support assembly 102.

FIG. 7 illustrates the support assembly 102 in the first position, after the rail assembly 600 has been removed. For example, FIG. 7 may illustrate a configuration of the support assembly 102 after the refrigerated case 100 has been unloaded at an installation location (e.g., a customer's store, etc.). As shown in FIG. 7, the support assembly 102 is supported by the ball bearing 448 of the bearing assembly 434 and the ball bearing 460 of the bearing assembly 436 on a surface, shown as a surface 700. The support assembly 102 may be moved relative to the surface 700 by, for example, pushing the refrigerated case 100 which causes rotation of the ball bearing 448 of the bearing assembly 434 within the socket 450 relative to the surface 700 and/or rotation of the ball bearing 460 of the bearing assembly 436 within the socket 462 relative to the surface 700.

FIG. 7 also illustrates that the refrigerated case 100 includes a frame, shown as a frame 701, having an aperture, shown as an aperture 702, that is configured to be selectively aligned with the aperture 310, and another aperture, shown as an aperture 703, that is configured to be selectively aligned with the aperture 312. To couple the support assembly 102 to the refrigerated case 100, the fastener 311 is positioned within the aperture 310 and the aperture 702 and the fastener 313 is positioned within the aperture 312 and the aperture 703.

When the support assembly 102 is in the first position, force from the refrigerated case 100 (e.g., from a weight or loading of the refrigerated case 100, etc.) is translated to the frame 701, to the top surface 304 and the top surface 306 of the body 300, to the shoulder 440 of the bearing assembly 434 and the shoulder 454 of the bearing assembly 436, to the socket 450 of the bearing assembly 434 and the socket 462 of the bearing assembly 436, and to the ball bearing 448 of the bearing assembly 434 and the ball bearing 460 of the bearing assembly 436. In this way, the refrigerated case 100 may be supported by the ball bearing 448 of the bearing assembly 434 and the ball bearing 460 of the bearing assembly 436 when the support assembly 102 is in the first position.

To move the support assembly 102 from the first position to the second position (e.g., to extend the leg 464, etc.) the fastener 316 is threaded into the aperture 314 such that the fastener 316 contacts the top face 468 of the leg 464 and biases the leg 464 towards the surface 700. For example, the fastener 316 can be drawn into and out of the aperture 314 (e.g., via a drill, via a screw driver, via an impact driver, etc.) to move the support assembly 102 between the first position and the second position.

As shown in FIG. 8, the support assembly 102 is in the second position. When the support assembly 102 is in the second position, force from the refrigerated case 100 is translated to the frame 701, to the top surface 304 and the top surface 306 of the body 300, to the fastener 316 via the threaded engagement between the fastener 416 and the aperture 314, to the top face 468 of the leg 464, and from the support 470 to the surface 700. When the support assembly 102 is in the second position, the ball bearing 448 of the bearing assembly 434 and the ball bearing 460 of the bearing assembly 436 do not contact the surface 700.

As also shown in FIGS. 7 and 8, the refrigerated case 100 also includes a channel, shown as an access channel 704 that is positioned over the aperture 314, and therefore the fastener 316, when the support assembly 102 is coupled to the refrigerated case 100. The access channel 704 provides access to the fastener 316 when the support assembly 102 is coupled to the refrigerated case 100. For example, a user may insert a socket or implement through the access channel 704 to draw the fastener 316 into and out of the aperture 314.

To continue to move the support assembly 102 from the first position to the second position, the fastener 316 is drawn into the aperture 314, causing the leg 464 to progressively extend from the aperture 466 such that the support 470 is biased against the surface 700. When the ball bearing 448 of the bearing assembly 434 and the ball bearing 460 of the bearing assembly 436 are elevated off of the surface 700, the support assembly 102 is in the second position, as shown in FIG. 8. In the second position, the ball bearing 448 of the bearing assembly 434 and the ball bearing 460 of the bearing assembly 436 do not facilitate movement of the support assembly 102 with respect to the surface 700. Instead, the leg 464, the fastener 316, and the aperture 314 bear the load of the refrigerated case 100 when the support assembly 102 is in the second position.

Through the use of the support assembly 102, the refrigerated case 100, as well as any other structure having a load supported by the support assemblies 102, can be moved along the surface 700 while the support assembly 102 is in the first position and can be secured in a position relative to the surface 700 when the support assembly 102 is in the second position. For example, the refrigerated case 100 can be moved into an aisle and aligned with other refrigerated cases 100 in the aisle when the support assembly 102 is in the first position. Once the refrigerated case 100 has been properly aligned, the support assembly 102 can be transitioned to the second position such that the alignment of the refrigerated case 100 is maintained. In this way, the support assembly 102 provides flexibility in the movement and support of the refrigerated case 100.

V. The Support Assembly According to a Second Embodiment

FIGS. 9-12 illustrate the support assembly 102 in greater detail, according to a second embodiment. The support assembly 102 includes a structure (e.g., base, etc.), shown as a body 900, and an assembly (e.g., system, mechanism, etc.), shown as a coupling assembly (e.g., sleeve, etc.) 902, similar to the coupling assembly 302 previously described. The body 900 includes a first surface (e.g., side, face, etc.), shown as a top surface 904. The top surface 904 is generally flat such that the top surface 904 may be mounted flush against a structure, such as the refrigerated case 100. The body 900 may be cast (e.g., die cast, etc.) from, for example, aluminum or a composite material (e.g., polymeric material, resin-based material, etc.).

The top surface 904 includes a first aperture (e.g., opening, hole, recess, etc.), shown as an aperture 906, and a second aperture, shown as an aperture 908. Each of the aperture 906 and the aperture 908 is configured to receive (e.g., structured to receive, capable of receiving, etc.) a fastener (e.g., bolt, screw, threaded fastener, etc.) (not shown). These fasteners couple the top surface 904, and therefore the body 900 and the support assembly 102, to a structure, such as the refrigerated case 100 shown in FIGS. 1 and 2. For example, these fasteners may couple the support assembly 102 to a portion of the perimeter of the bottom side of the refrigerated case 100. These fasteners are similar to the fastener 311 and the fastener 313 previously described.

The top surface 904 also includes an aperture, shown as an aperture 910, that is configured to receive an insert (e.g., threaded insert, etc.), shown as an insert 911. For example, the insert 911 may be coupled to the aperture 910 through the use of adhesive or the insert 911 may be friction fit (e.g., press fit, etc.) within the aperture 910. In another example, the insert 911 is threaded into the aperture 910 through the use of a threaded interface on the insert 911 and a corresponding threaded interface within the aperture 910. The insert 911 and the aperture 910 may be structurally integrated (e.g., through a milling or machining operation, etc.). The insert 911 is configured to receive a fastener, shown as a fastener 912. The fastener 912 may be separated from the top surface 904 by a washer, shown as a washer 913. The aperture 910 is defined by an axis, shown as a central axis 914. In an exemplary embodiment, the aperture 910 is centered on the top surface 904 such that the body 900 is symmetrical about a first plane bisecting the aperture 910 and a second plane bisecting the aperture 910 and orthogonal to the first plane.

The body 900 also includes a first side (e.g., face, surface, etc.), shown as a first side 916, and a second side, shown as a second side 918, opposite the first side 916. In an exemplary embodiment, the first side 916 and the second side 918, when the support assembly 102 is coupled to a structure, are generally orthogonal to a surface upon which the support assembly 102 is supported.

The first side 916 includes a first plurality of projections, shown as bracket mounts 920, and a second plurality of projections, shown as plate mounts 922. Each of the bracket mounts 920 and the plate mounts 922 extend (e.g., project, protrude, etc.) from the first side 916. In an exemplary embodiment, the bracket mounts 920 extend in a direction orthogonal to a direction in which the plate mounts 922 extend. As will be explained in more detail herein, the bracket mounts 920 selectively facilitate coupling of the body 900 to a bracket of the coupling assembly 902 and the plate mounts 922 selectively facilitate coupling of the body 900 to a plate, shown as a plate 923, of the support assembly 102.

Each of the bracket mounts 920 includes an opening, shown as an opening 924, that is configured to receive a fastener, shown as a fastener 926, for coupling the coupling assembly 902 to the first side 916 of the body 900. The fasteners 926 are separated from the coupling assembly 902 by washers, shown as washers 928. Each of the plate mounts 922 includes an opening, shown as an opening 930, that is configured to receive a fastener, shown as a fastener 932, for coupling the body 900 to the plate 923 through apertures, shown as apertures 933, in the plate 923. The fasteners 932 are separated from the plate 923 by washers, shown as washers 934.

Similarly, the second side 918 includes a first plurality of projections, shown as bracket mounts 936, and a second plurality of projections, shown as plate mounts 938. Each of the bracket mounts 936 and the plate mounts 938 extend from the second side 918. In an exemplary embodiment, the bracket mounts 936 extend in a direction orthogonal to a direction in which the plate mounts 938 extend. As will be explained in more detail herein, the bracket mounts 936 selectively facilitate coupling of the body 900 to a bracket of the coupling assembly 902 and the plate mounts 938 selectively facilitate coupling of the body 900 to the plate 923.

Each of the bracket mounts 936 includes an opening, shown as an opening 940, that is configured to receive the fastener 926 for coupling the coupling assembly 902 to the second side 918 of the body 900. Each of the plate mounts 938 includes an opening, shown as an opening 942, that is configured to receive a fastener, shown as a fastener 944, for coupling the body 900 to the plate 923 through apertures, shown as apertures 945, in the plate 923. The fasteners 944 are separated from the plate 923 by washers, shown as washers 946.

In an exemplary embodiment, each of the openings 924 is aligned with one of the openings 940. In various embodiments, bracket mounts 920 are disposed along a first plane and the bracket mounts 936 are disposed along a second plane parallel to the first plane. In various embodiments, the plate mounts 922 are disposed along a first plane and the plate mounts 938 are disposed along the first plane such that the openings 930 are centered on axes that are parallel to axes upon which the openings 942 are centered.

The first side 916 also includes a projection, shown as a projection 948, that extends from the body 900 towards the plate 923. Similarly, the second side 918 also includes a projection, shown as a projection 950, that extends from the body 900 towards the plate 923. As will be described in more detail herein, the projection 948 and the projection 950 cooperate to facilitate movement of the plate 923 relative to the body 900, and therefore relative to a structure, such as the refrigerated case 100, to which the support assembly 102 is coupled.

The plate 923 is coupled to the plate mounts 922, through the use of the fasteners 932, and to the plate mounts 938, through the use of the fasteners 944. In an exemplary embodiment, the plate mounts 922 and the plate mounts 938 all extend from the body 900 an identical distance such that the plate 923 is disposed along a plane parallel to a plane along which the body 900 is disposed.

The plate 923 includes a first aperture, shown as an aperture 952, and a second aperture, shown as an aperture 954. The aperture 952 is located on a side of the plate 923 that is opposite from a side upon which the aperture 954 is located. The aperture 952 is defined by an axis, shown as a central axis 956, and the aperture 954 is defined by an axis, shown as a central axis 958. According to an exemplary embodiment, the central axis 956 and the central axis 958 are parallel to the central axis 914 and orthogonal to a plane upon which the top surface 904 is disposed.

The support assembly 102 also includes a first assembly (e.g., ball transfer, ball bearing caster, etc.), shown as a bearing assembly 960, and a second assembly (e.g., ball transfer, ball bearing caster, etc.), shown as a bearing assembly 962. The bearing assembly 960 is selectively repositionable within the aperture 952 and the bearing assembly 962 is selectively repositionable within the aperture 954. The bearing assembly 960 and the bearing assembly 962 are coupled to the body 900 and are selectively repositioned to cooperatively support a structure that is coupled to the support assembly 102.

The bearing assembly 960 includes a housing, shown as a housing 964. The housing 964 of the bearing assembly 960 includes a shoulder, shown as a shoulder 966. The shoulder 966 segments the housing 964 into a first portion, shown as an exterior portion 968, and a second portion, shown as an interior portion 970. The shoulder 966 is contiguous with both the exterior portion 968 and the interior portion 970.

The support assembly 102 also includes a member, shown as a coupler 972, that defines an opening, shown as an opening 973. The coupler 972 is coupled to the bearing assembly 960. Specifically, the housing 964 of the bearing assembly 960 is configured such that the interior portion 970 is received in, and coupled to, the opening 973 of the coupler 972 while the shoulder 966 abuts, or is adjacent to, a bottom surface of the coupler 972 and the exterior portion 968 protrudes from the coupler 972. For example, the interior portion 970 of the bearing assembly 960 may be coupled to the opening 973 of the coupler 972 through the use of adhesive or the interior portion 970 of the bearing assembly 960 may be friction fit (e.g., press fit, etc.) within the opening 973 of the coupler 972. In another example, the interior portion 970 of the bearing assembly 960 is threaded into the coupler 972 through the use of a threaded interface on the interior portion 970 of the bearing assembly 960 and a corresponding threaded interface within the opening 973 of the coupler 972. The housing 964 of the bearing assembly 960 may be configured such that the exterior portion 968 of the bearing assembly 960 and the interior portion 970 of the bearing assembly 960 are structurally integrated (e.g., through a milling or machining operation, etc.). In some applications, the housing 964 of the bearing assembly 960 is configured such that the exterior portion 968 of the bearing assembly 960 and the interior portion 970 of the bearing assembly 960 are separate components that are joined (e.g., through a threaded interface, through a welding operation, etc.). In some embodiments, the housing 964 of the bearing assembly 960 is structurally integrated within the coupler 972.

The bearing assembly 960 also includes a bearing, shown as a ball bearing 974, and a structure, shown as a socket 976. The ball bearing 974 of the bearing assembly 960 is positioned, in part, within the housing 964 of the bearing assembly 960 and partially extends from the housing 964 of the bearing assembly 960. The ball bearing 974 of the bearing assembly 960 is positioned, in part, within the socket 976 of the bearing assembly 960. In an exemplary embodiment, the socket 976 of the bearing assembly 960 is partially defined by (e.g., contained within, positioned within, etc.) the exterior portion 968 of the bearing assembly 960 and the interior portion 970 of the bearing assembly 960. In other embodiments, the socket 976 of the bearing assembly 960 is only defined by the exterior portion 968 of the bearing assembly 960 and not by the interior portion 970 of the bearing assembly 960. The ball bearing 974 of the bearing assembly 960 may be constructed from, for example, carbon steel or nylon. While not shown, it is understood that the housing 964 of the bearing assembly 960 may include an insert that is press fit into the exterior portion 968 of the bearing assembly 960 to form the socket 976 of the bearing assembly 960.

Similarly, the bearing assembly 962 includes a housing, shown as a housing 978. The housing 978 of the bearing assembly 962 includes a shoulder, shown as a shoulder 980. The shoulder 980 segments the housing 978 into a first portion, shown as an exterior portion 982, and a second portion, shown as an interior portion 984. The shoulder 980 is contiguous with both the exterior portion 982 and the interior portion 984.

The support assembly 102 also includes a member, shown as a coupler 986, that defines an opening, shown as an opening 987. The coupler 986 is coupled to the bearing assembly 962. Specifically, the housing 978 of the bearing assembly 962 is configured such that the interior portion 984 is received in, and coupled to, the opening 987 of the coupler 986 while the shoulder 980 abuts, or is adjacent to, a bottom surface of the coupler 986 and the exterior portion 982 protrudes from the coupler 986. For example, the interior portion 984 of the bearing assembly 962 may be coupled to the opening 987 of the coupler 986 through the use of adhesive or the interior portion 984 of the bearing assembly 962 may be friction fit (e.g., press fit, etc.) within the opening 987 of the coupler 986. In another example, the interior portion 984 of the bearing assembly 962 is threaded into the opening 987 of the coupler 986 through the use of a threaded interface on the interior portion 984 of the bearing assembly 962 and a corresponding threaded interface within the opening 987 of the coupler 986. The housing 978 of the bearing assembly 962 may be configured such that the exterior portion 982 of the bearing assembly 962 and the interior portion 984 of the bearing assembly 962 are structurally integrated (e.g., through a milling or machining operation, etc.). In some applications, the housing 978 of the bearing assembly 962 is configured such that the exterior portion 982 of the bearing assembly 962 and the interior portion 984 of the bearing assembly 962 are separate components that are joined (e.g., through a threaded interface, through a welding operation, etc.). In some embodiments, the housing 978 of the bearing assembly 962 is structurally integrated within the coupler 986.

The bearing assembly 962 also includes a bearing, shown as a ball bearing 988, and a structure, shown as a socket 990. The ball bearing 988 of the bearing assembly 962 is positioned, in part, within the housing 978 of the bearing assembly 962 and partially extends from the housing 978 of the bearing assembly 962. The ball bearing 988 of the bearing assembly 962 is positioned, in part, within the socket 990 of the bearing assembly 962. In an exemplary embodiment, the socket 990 of the bearing assembly 962 is partially defined by (e.g., contained within, positioned within, etc.) the exterior portion 982 of the bearing assembly 962 and the interior portion 984 of the bearing assembly 962. In other embodiments, the socket 990 of the bearing assembly 962 is only defined by the exterior portion 982 of the bearing assembly 962 and not by the interior portion 984 of the bearing assembly 962. The ball bearing 988 of the bearing assembly 962 may be constructed from, for example, carbon steel or nylon. While not shown, it is understood that the housing 978 of the bearing assembly 962 may include an insert that is press fit into the exterior portion 982 of the bearing assembly 962 to form the socket 990 of the bearing assembly 962.

The insert 911 defines an aperture, shown as an aperture 996, that is threaded and configured to be threadably engaged with the fastener 912. The aperture 996 is centered on the central axis 914 and is aligned with the aperture 1004. As opposed to the aperture 906 and the aperture 908, which cooperate with the fasteners to couple the support assembly 102 to a structure, such as the refrigerated case 100, the fastener 912 and the aperture 996 do not cooperate to couple the support assembly 102 to the structure. Instead, the fastener 912 and the aperture 996 cooperate to adjust the support assembly 102 to selectively bring the bearing assembly 960 and the bearing assembly 962 into contact with the surface 700. The insert 911 also defines a flange, shown as a flange 998. The flange 998 is configured to interface with a flange, shown as a flange 1000, of the body 900. The flange 1000 also defines another opening in the body 900.

The support assembly 102 also includes a member (e.g., piston, stand, etc.), shown as a leg 1002. The leg 1002 is configured to selectively support the support assembly 102, and therefore support a structure that is coupled to the support assembly 102. The leg 1002 is selectively repositionable (e.g., translatable, etc.) within an aperture, shown as an aperture 1004, within the plate 923. The aperture 1004 is aligned with the aperture 910. In an exemplary embodiment, the aperture 910, the aperture 1004, and the aperture 996 are homocentric.

The leg 1002 is not threadably engaged with the aperture 1004. The leg 1002 defines a face, shown as a top face 1006, and an opening, shown as an opening 1008, extending into the leg 1002 from the top face 1006. The opening 1008 is aligned with the aperture 996, threaded, and configured to threadably engage with the fastener 912. The leg 1002 also includes an aperture, shown as an aperture 1010, that is disposed along an axis orthogonal to the central axis 914. The aperture 1010 is configured to receive a fastener (e.g., pin, bolt, etc.), shown as a fastener 1012. The aperture 1010 may be configured such that the fastener 1012 abuts a wall defining the opening 1008.

The leg 1002 includes a portion (e.g., flange, etc.), shown as a support 1014, that is configured to selectively interface with the surface 700. The support 1014 is positioned between a bottom surface of the plate 923 and the surface 700. In operation, the leg 1002 is configured to be drawn into an out of the aperture 1004 through rotation of the fastener 912 within the opening 1008. This rotation causes displacement of the support 1014 relative to the surface 700. In this way, the fastener 912 may be rotated to selectively cause the support 1014 to contact the surface 700 or to cause the top face 1006 of the leg 1002 to bias the flange 998 of the insert 911 against the flange 1000 of the body 900. Displacement of the leg 1002 through rotation of the fastener 912 similar causes displacement of the aperture 1010 and therefore the fastener 1012.

The support assembly 102 also includes a first member, shown as a connector 1016, and a second member, shown as a connector 1018. The connector 1016 includes an aperture, shown as an aperture 1020, that is configured to receive the fastener 1012. In this way, movement of the leg 1002 is tied to movement of the connector 1016. The connector 1016 includes an aperture (not shown) that is configured to receive a fastener, shown as a fastener 1024. The projection 950 includes an aperture, shown as an aperture 1026, that is configured to receive the fastener 1024. The connector 1016 also includes another aperture (not shown) that is configured to receive a fastener, shown as a fastener 1028. The coupler 972 includes a projection, shown as a projection 1030, that includes an aperture, shown as an aperture 1032, that is configured to receive the fastener 1028. In this way, the connector 1016 pivots about the fastener 1024, and therefore the aperture 1026 in the projection 950, to couple displacement of the leg 1002 to displacement of the bearing assembly 960. As the fastener 912 is drawn into the aperture 996, the leg 1002 moves upwards, causing a clockwise rotation of the connector 1016 and downward movement of the bearing assembly 960. As the fastener 912 is drawn out of the aperture 996, the leg 1002 moves downwards, causing a counterclockwise rotation of the connector 1016 and upward movement of the bearing assembly 960.

Similarly, the connector 1018 includes an aperture (not shown) that is configured to receive the fastener 1012. In this way, movement of the leg 1002 is tied to movement of the connector 1018. The connector 1018 includes an aperture (not shown) that is configured to receive a fastener, shown as a fastener 1034. The projection 948 includes an aperture, shown as an aperture 1036, that is configured to receive the fastener 1034. The connector 1018 also includes another aperture (not shown) that is configured to receive a fastener, shown as a fastener 1038. The coupler 986 includes a projection, shown as a projection 1040, that includes an aperture, shown as an aperture 1042, that is configured to receive the fastener 1038. In this way, the connector 1018 pivots about the fastener 1034, and therefore the aperture 1036 in the projection 948, to couple displacement of the leg 1002 to displacement of the bearing assembly 962. As the fastener 912 is drawn into the aperture 996, the leg 1002 moves upwards, causing a counterclockwise rotation of the connector 1018 and downward movement of the bearing assembly 962. As the fastener 912 is drawn out of the aperture 996, the leg 1002 moves downwards, causing a clockwise rotation of the connector 1018 and upward movement of the bearing assembly 962.

The ball bearing 974 of the bearing assembly 960 and the ball bearing 988 of the bearing assembly 962 extend a first distance from the plate 923 (e.g., from a bottom surface of the plate 923, etc.). For example, the ball bearing 974 of the bearing assembly 960 and the ball bearing 988 of the bearing assembly 962 may extend one inch from the bottom surface of the plate 923. Similarly, the support 1014 is configured to extend a second distance from the plate 923 (e.g., from a bottom surface of the plate 923, etc.). For example, the support 1014 may selectively extend 1.25 inches from the bottom surface of the plate 923.

The coupling assembly 902 includes a bracket (e.g., a coupler, etc.), shown as a bracket 1044, that is configured to be selectively coupled to the body 900. The bracket 1044 is similar to the bracket 490 previously described and includes structure similar to the second hole 494. The bracket 1044 may be constructed from, for example, grade 8 steel. The bracket 1044 is coupled to the body 900 through the use of the fasteners 926 and a fastener, shown as a fastener 1046, which is received in an aperture, shown as a hole 1047, in the bracket 1044 and an aperture, shown as an opening 1048, in the plate 923. The opening 1048 is located on a protrusion, shown as a projection 1050, extending from the plate 923. The fastener 1046 is separated from the projection 1050 by a washer, shown as a washer 1052. The plate 923 also includes another opening, shown as an opening 1049, and another protrusion, shown as a projection 1051. The opening 1049 and the projection 1051 are identical to the opening 1048 and the projection 1050, and are located on an opposite side of the plate 923. The opening 1049 and the projection 1051 are utilized when the coupling assembly 902 is instead coupled to the bracket mounts 936.

The bracket 1044 includes holes (not shown) that are configured to receive the fasteners 926 and a hole that is configured to receive the fastener 1046. The bracket 1044 also includes an aperture, shown as a hole 1054, that is configured to receive the fastener 1046. In an exemplary embodiment, the holes that receive the fasteners 926 are aligned and the hole 1054 is aligned with the hole that receives the fastener 1046 (e.g., along a central axis of the fastener 1046, etc.). The hole 1054 is configured to facilitate movement of the fastener 1046 completely therethrough. In this way, the fastener 1046 may be inserted through the hole 1054 into the hole that receives the fastener 1046. The hole 1054 may receive a tool (e.g., socket, wrench, screwdriver, bit, etc.) configured to rotate the fastener 1046 such that the fastener 1046 is threaded into the opening 1048.

Figure 9:
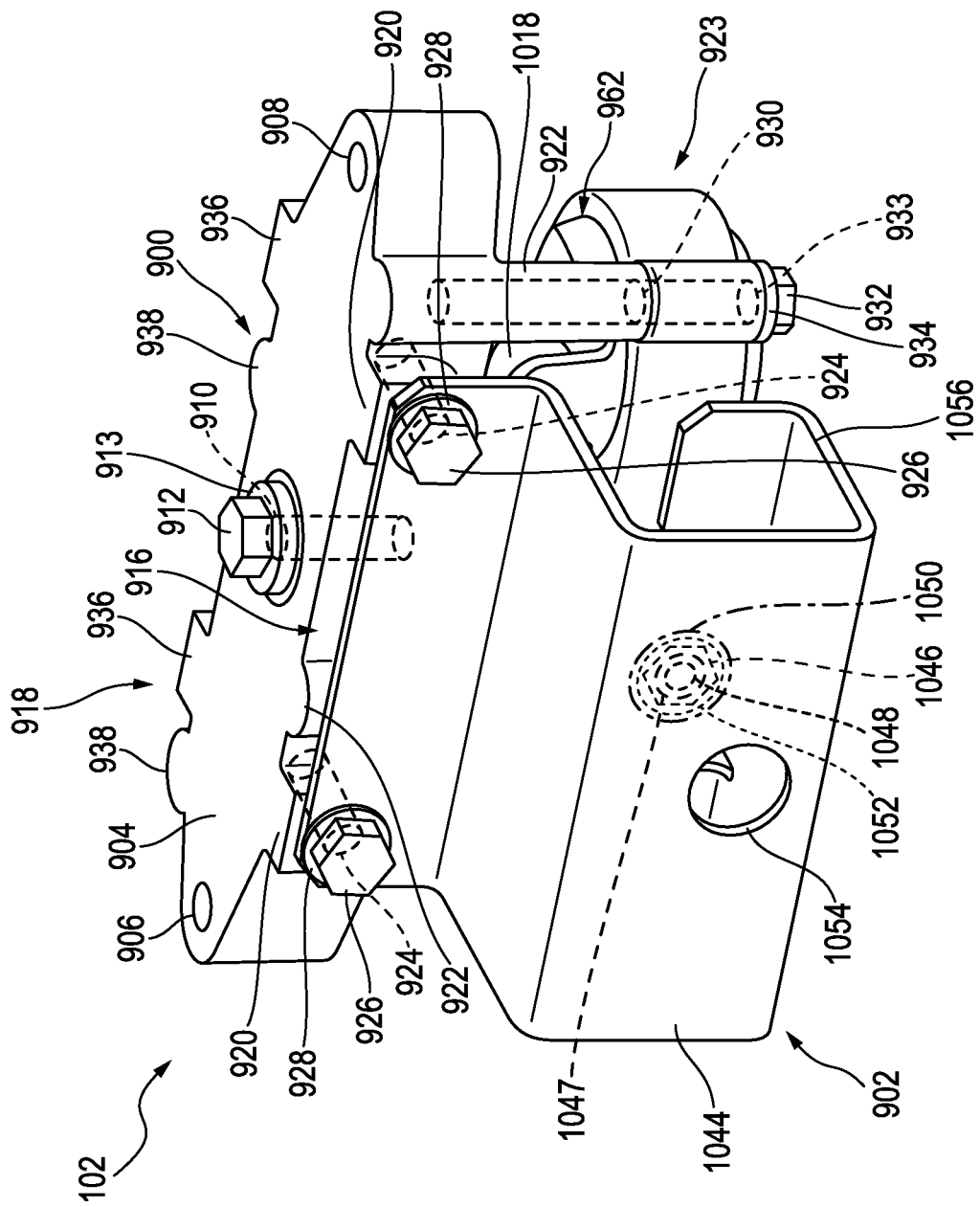
FIG. 9 is a top front perspective view of a support assembly for incorporation with a refrigerated case, such as the refrigerated case shown in FIG. 1, according to another exemplary embodiment of the present disclosure.
Figure 10:
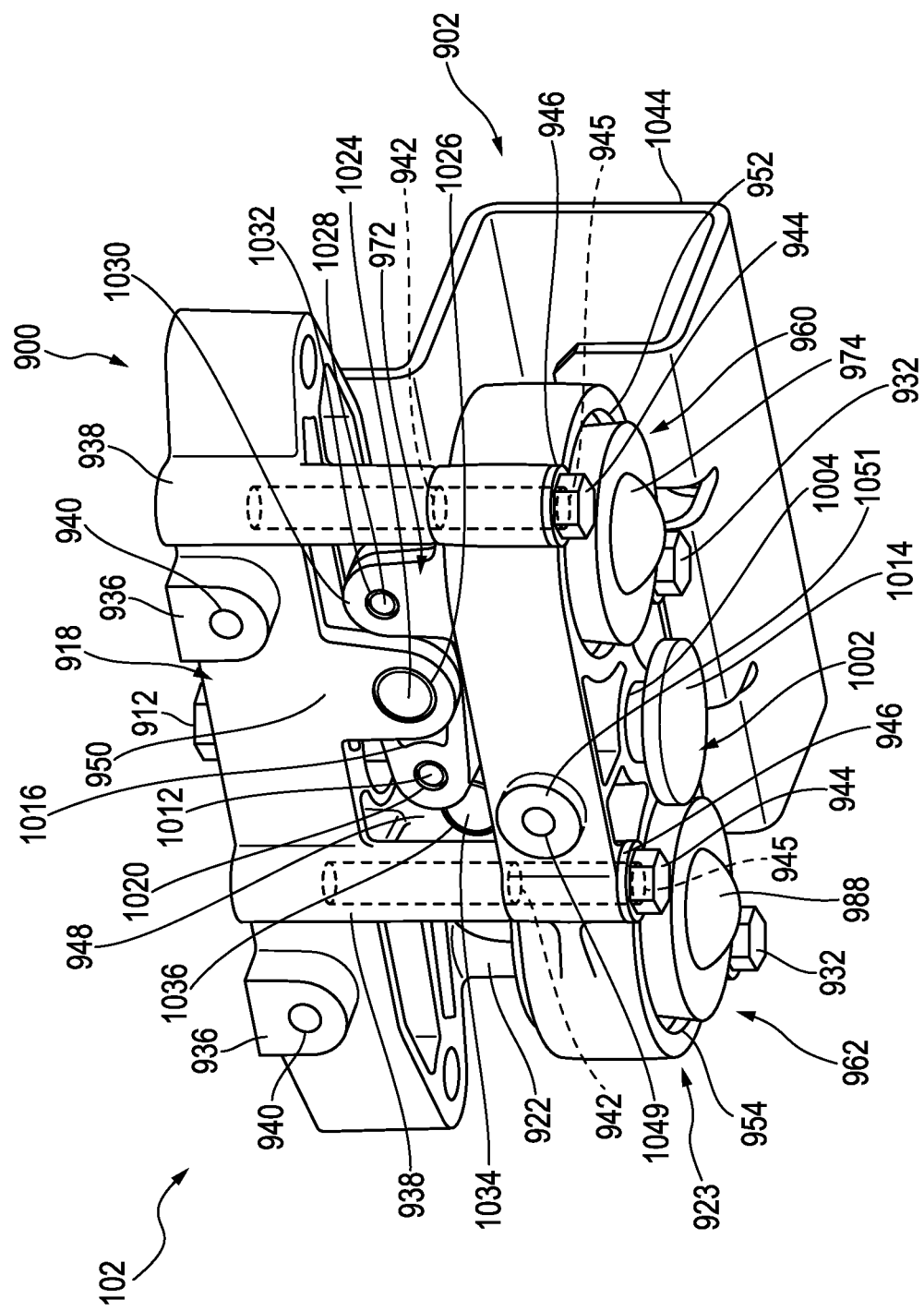
FIG. 10 is a bottom rear perspective view of a support assembly, such as the support assembly shown in FIG. 9.

The bracket 1044 defines an aperture, shown as an opening 1056. The opening 1056 is configured to receive a rail for supporting the support assembly 102 above the surface. The bracket 1044 may be variously configured such that the opening 1056 has a target configuration. As shown in FIG. 9, the opening 1056 is generally square and functions to receive a rail of generally square shape. However, the opening 1056 may be rectangular, hexagonal, or otherwise shaped to receive a rail of a different configuration. The bracket 1044 and the opening 1056 function as the bracket 490 and the opening 502 previously described. Accordingly, the bracket 1044 may be coupled to the rail assembly 600, such as to the rail member 602.

To assemble the support assembly 102, the bearing assembly 960 and the bearing assembly 962 are first assembled. In an exemplary embodiment, the bearing assembly 960 is assembled by placing the ball bearing 974 in the interior portion 970 and pressing the exterior portion 968 over the ball bearing 974, thereby sealing the ball bearing 974 in the bearing assembly 960. Similarly, the bearing assembly 962 is assembled by placing the ball bearing 988 in the interior portion 984 and pressing the exterior portion 982 over the ball bearing 988, thereby sealing the ball bearing 988 in the bearing assembly 962, in an exemplary embodiment.

Next, the bearing assembly 960 is inserted into the coupler 972 and the bearing assembly 962 is inserted into the coupler 986. For example, the bearing assembly 960 may be press fit into the coupler 972 and the bearing assembly 962 may be press fit into the coupler 986. Then, the coupler 972 is placed within the aperture 952 in the plate 923 and the coupler 986 is placed within the aperture 954 in the plate 923.

The connector 1016 is then coupled to the coupler 972 by inserting the fastener 1028 through the aperture 1032 in the coupler 972 and into a corresponding aperture in the connector 1016. Similarly, the connector 1018 is then coupled to the coupler 986 by inserting the fastener 1038 through the aperture 1042 in the coupler 986 and into a corresponding aperture in the connector 1018.

Then the insert 911 is inserted into the aperture 910. For example, the insert 911 may be pressed into the aperture 910 such that the flange 998 of the insert 911 abuts the flange 1000 of the body 900. The plate 923 is then coupled to the body 900. Specifically, the fasteners 932 are inserted through the washers 934, through the apertures 933, and into the plate mounts 922 and the fasteners 944 are inserted through the washers 946, through the apertures 945, and into the plate mounts 938.

Next, the connector 1016 is coupled to the projection 950 in the body 900 by inserting the fastener 1024 through the aperture 1026 in the projection 950 and into a corresponding aperture in the connector 1016. Similarly, the connector 1018 is coupled to the projection 948 in the body 900 by inserting the fastener 1034 through the aperture 1036 in the projection 948 and into a corresponding aperture in the connector 1018.

The leg 1002 is then inserted into the aperture 1004 such that the support 1014 is on an opposite side of the plate 923 as the body 900. The connector 1016 and the connector 1018 are then coupled to the leg 1002. Specifically, the fastener 1012 is inserted into the aperture 1010 in the leg 1002, and then the fastener 1012 is inserted into the aperture 1020 in the connector 1016 and a similar aperture in the connector 1018. The fastener 912 is then inserted into the aperture 996 in the insert 911 and into the opening 1008 in the leg 1002. Then, the leg 1002 may be selectively repositioned using the fastener 912.

The coupling assembly 902 is then attached to the body 900 by aligning the holes in the bracket 1044 with the openings 924 in the bracket mounts 920 and by aligning the hole 1047 in the bracket 1044 with the opening 1048 in the plate 923. Next, the fasteners 926 are inserted through the washers 928, into the holes in the bracket 1044, and into the openings 924 in the bracket mounts 920, and the fastener 1046 is inserted through the washer 1052, through the hole 1054, through the hole 1047, and into the opening 1048 in the plate 923.

As a result of these operations, the support assembly 102 has been assembled. The support assembly 102 may then be coupled to the refrigerated case 100 by inserting fasteners through the aperture 906 and the aperture 908 into apertures in the refrigerated case 100. Finally, a rail assembly, such as the rail assembly 600, may then be coupled to the support assembly 102. Other processes for assembling the support assembly 102 are similarly possible. To couple the support assembly 102 to the refrigerated case 100, a fastener is positioned within the aperture 906 and the aperture 703 and a fastener is positioned within the aperture 908 and the aperture 702.

In some embodiments, the body 900 is constructed from plastic that is injection molded. In various embodiments, the various openings and holes described herein are threaded inserts. In various embodiments, the fastener 912, the fasteners 926, and the fastener 1046 are constructed from steel (e.g., grade 8.8 steel, etc.). In some embodiments, the leg 1002 is constructed from steel. In some embodiments, the bracket 1044 is constructed from steel (e.g., stainless steel, galvanized steel, etc.).

VI. Movement of the Support Assembly According to the Second Embodiment

Figure 11:
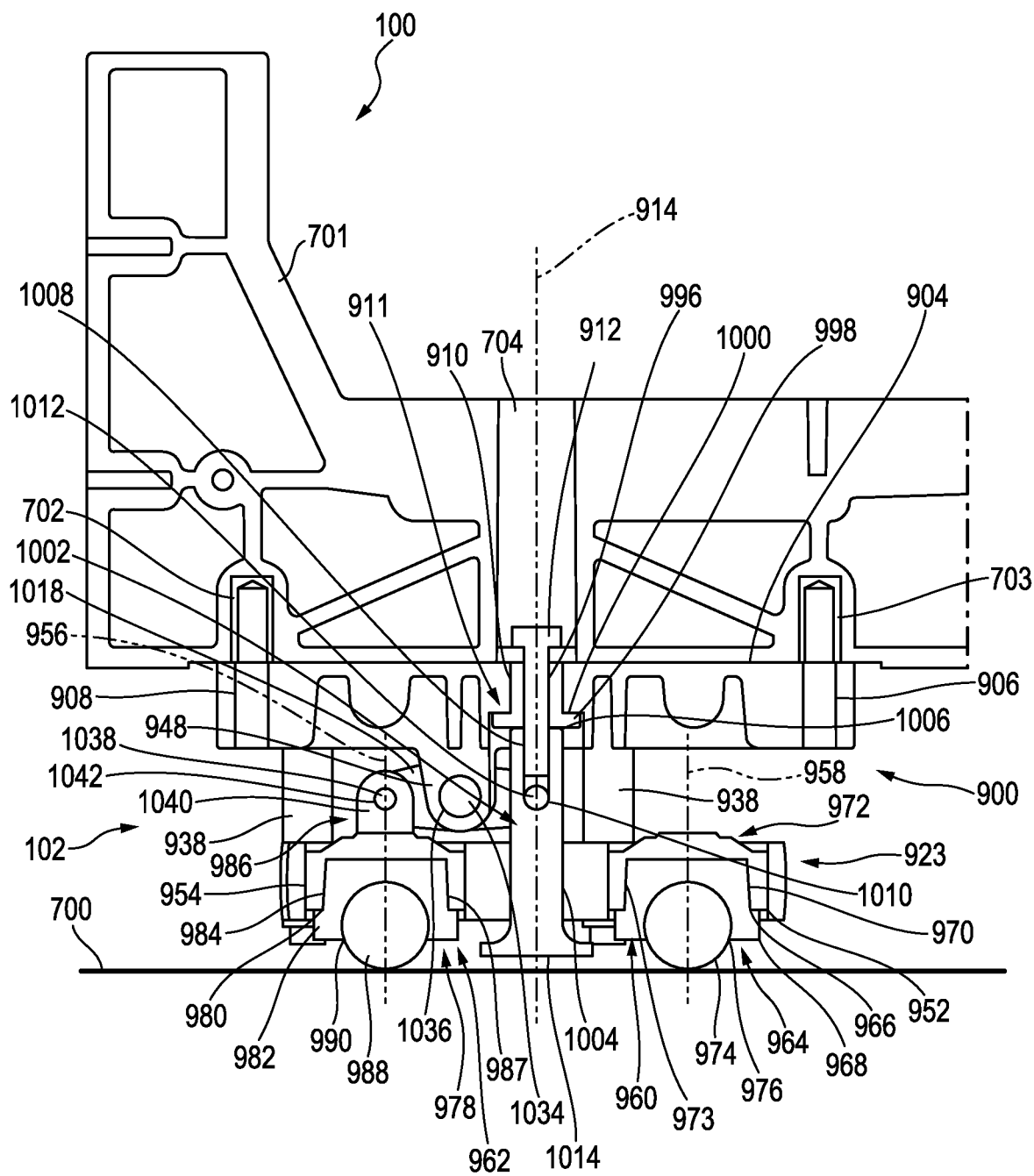
FIG. 11 is a cross-sectional view of a support assembly, such as the support assembly shown in FIG. 9, coupled to a refrigerated case, such as the refrigerated case shown in FIG. 1.
Figure 12:
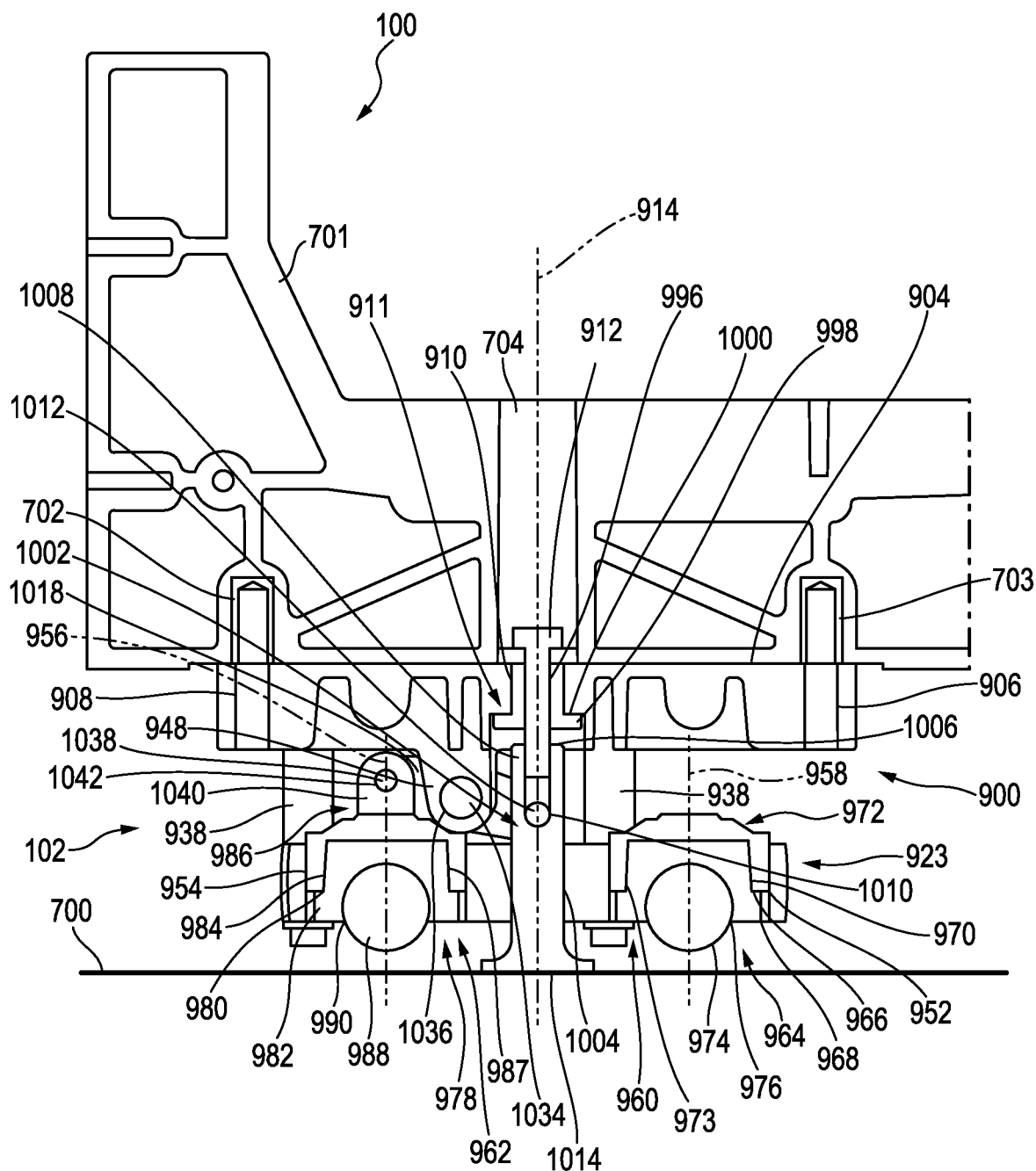
FIG. 12 is another cross-sectional view of a support assembly, such as the support assembly shown in FIG. 9, coupled to a refrigerated case, such as the refrigerated case shown in FIG. 1.

As shown in FIGS. 11 and 12, the support assembly 102 is mounted to the refrigerated case 100. As previously mentioned, the support assembly 102 described and shown in FIGS. 9-12 is operable with the rail assembly 600 as the support assembly 102 described and shown in FIGS. 3-9. FIGS. 11 and 12 illustrate the support assembly 102 without the coupling assembly 902.

The support assembly 102 is operable between a first position and a second position. In the first position, the ball bearing 974 of the bearing assembly 960 and the ball bearing 988 of the bearing assembly 962 each contact the surface 700 such that the support assembly 102 may be easily moved along the surface 700. In the second position, the ball bearing 974 of the bearing assembly 960 and the ball bearing 988 of the bearing assembly 962 each do not contact the surface 700 such that the support assembly 102 may not be easily moved along the surface 700.

In the first position, the fastener 912 is positioned within the aperture 996 such that the leg 1002 is not biased against the surface 700 and the support 1014 is separated from the surface 700. In various applications, the support assembly 102 is in the first position when the rail assembly 600 is decoupled from the support assembly 102.

FIG. 11 illustrates the support assembly 102 in the first position, after the rail assembly 600 and the coupling assembly 902 have been removed. For example, FIG. 11 may illustrate a configuration of the support assembly 102 after the refrigerated case 100 has been unloaded at an installation location (e.g., a customer's store, etc.). As shown in FIG. 11, the support assembly 102 is supported by the ball bearing 974 of the bearing assembly 960 and the ball bearing 988 of the bearing assembly 962 on the surface 700. The support assembly 102 may be moved relative to the surface 700 by, for example, pushing the refrigerated case 100 which causes rotation of the ball bearing 974 of the bearing assembly 960 within the socket 976 relative to the surface 700 and/or rotation of the ball bearing 988 of the bearing assembly 962 within the socket 990 relative to the surface 700.

When the support assembly 102 is in the first position, force from the refrigerated case 100 (e.g., from a weight or loading of the refrigerated case 100, etc.) is translated to the frame 701, to the top surface 904 of the body 900, to the threaded engagement between the fastener 912 and the aperture 996 of the insert 911, to the interaction between the flange 998 of the insert 911 and the flange 1000 of the body 900, to the leg 1002, to the fastener 1012 and the aperture 1010, to the connector 1016 and the connector 1018, to the coupler 972 and the coupler 986, and to the ball bearing 974 of the bearing assembly 960 and the ball bearing 988 of the bearing assembly 962. In this way, the refrigerated case 100 may be supported by the ball bearing 974 of the bearing assembly 960 and the ball bearing 988 of the bearing assembly 962 when the support assembly 102 is in the first position.

To move the support assembly 102 from the first position to the second position (e.g., to extend the leg 1002, to retract the ball bearing 974 of the bearing assembly 960, to retract the ball bearing 988 of the bearing assembly 962, etc.) the fastener 912 is partially threaded out of the aperture 996 such that the fastener 912 is correspondingly partially threaded out of the opening 1008. This rotation of the fastener 912 causes the leg 1002 to move towards the surface and causes corresponding rotations of the connector 1016 and the connector 1018, thereby brining the support 1014 into contact with the surface 700. For example, the fastener 912 can be drawn into and out of the aperture 996 (e.g., via a drill, via a screw driver, via an impact driver, etc.) to move the support assembly 102 between the first position and the second position.

As shown in FIG. 12, the support assembly 102 is in the second position. When the support assembly 102 is in the second position, force from the refrigerated case 100 is translated to the frame 701, to the top surface 904 of the body 900, to the threaded engagement between the fastener 912 and the aperture 996 of the insert 911, to the interaction between the flange 998 of the insert 911 and the flange 1000 of the body 900, to the leg 1002, and to the support 1014. When the support assembly 102 is in the second position, the ball bearing 974 of the bearing assembly 960 and the ball bearing 988 of the bearing assembly 962 do not contact the surface 700 and are instead elevated from the surface through the rotation of the connector 1016 and the connector 1018.

To continue to move the support assembly 102 from the first position to the second position, the fastener 912 is drawn out of the aperture 996, causing the leg 1002 to progressively extend from the aperture 1004 such that the support 1014 is biased against the surface 700. When the ball bearing 974 of the bearing assembly 960 and the ball bearing 988 of the bearing assembly 962 are elevated off of the surface 700, the support assembly 102 is in the second position, as shown in FIG. 12. In the second position, the ball bearing 974 of the bearing assembly 960 and the ball bearing 988 of the bearing assembly 962 do not facilitate movement of the support assembly 102 with respect to the surface 700. Instead, the leg 1002, the fastener 912, the insert 911, and the body 900 bear the load of the refrigerated case 100 when the support assembly 102 is in the second position.

Through the use of the support assembly 102, the refrigerated case 100, as well as any other structure having a load supported by the support assemblies 102, can be moved along the surface 700 while the support assembly 102 is in the first position and can be secured in a position relative to the surface 700 when the support assembly 102 is in the second position. For example, the refrigerated case 100 can be moved into an aisle and aligned with other refrigerated cases 100 in the aisle when the support assembly 102 is in the first position. Once the refrigerated case 100 has been properly aligned, the support assembly 102 can be transitioned to the second position such that the alignment of the refrigerated case 100 is maintained. In this way, the support assembly 102 provides flexibility in the movement and support of the refrigerated case 100.

VII. Configuration of Exemplary Embodiments

While the support assembly 102 has been shown and described with regard to the refrigerated case 100, it is understood that the support assembly 102 can be utilized with other structures, such as refrigerators, freezers, cabinets, counters, bars, shelving units, displays (e.g., produce displays, etc.), and other similar structures.

As utilized herein, the terms "parallel," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. It is understood that the term "parallel" is intended to encompass de minimus variations as would be understood to be within the scope of the disclosure by those of ordinary skill in the art.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

The terms "coupled," "connected," "attached," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," etc.) are merely used to describe the orientation of various elements in the Figures. It should be noted that the orientation of various elements may differ according to other exemplary embodiments and that such variations are intended to be encompassed by the present disclosure.

The construction and arrangement of the elements of the support assembly 102 and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes, and omissions may also be made in the design, operating conditions, and arrangement of the various exemplary embodiments without departing from the scope of the present invention. For example, any of the apertures may not be included or may be replaced with internal holes, such that a fastener may be positioned within an aligned and adjacent aperture, may extend into the internal hole, and may not extend from the internal hole out of the body adjacent the internal hole. Also, for example, the order or sequence of any process or method steps, such as the steps of assembling the support assembly 102, may be varied or re-sequenced according to alternative embodiments. Any means-plus-function clause is intended to cover the structures described herein as performing the recited function and not only structural equivalents but also equivalent structures. Other substitutions, modifications, changes, and omissions may be made in the design, operating configuration, and arrangement of the preferred and other exemplary embodiments without departing from the scope of the appended claims.

What is claimed is:

1. A support assembly comprising:
   a body defining a first aperture, a second aperture aligned with the first aperture, and a first sleeve; and
   a first bearing assembly coupled to the body within the first sleeve, the first bearing assembly comprising a first ball bearing extending from the body a first distance;
   a first fastener threadably engaged with the first aperture; and
   a leg selectively repositionable within the second aperture, the leg comprising a support;
   wherein the first fastener is configured to be positioned within the first aperture to contact the leg such that the support extends from the body a second distance greater than the first distance;
   a bracket having a third aperture and a first opening; and
   a second fastener;
   wherein the body further defines a fourth aperture configured to receive the second fastener to couple the bracket to the body;
   wherein the leg defines a first portion, a second portion, a flange, and the support, the first portion contiguous with the support and the flange, the second portion contiguous with the flange; and
   wherein the first opening of the bracket is configured to receive the first portion of the leg such that the leg is repositionable within the first opening to cause the flange to interface with the bracket and be supported between the bracket and the body by the leg.

2. The support assembly of claim 1, wherein the first fastener is configured to be positioned within the first aperture such that the support extends from the body a third distance less than or equal to the first distance.

3. The support assembly of claim 2, wherein the first ball bearing facilitates movement of the support assembly when the support extends from the body the third distance; and
   wherein the first ball bearing does not facilitate movement of the support assembly when the support extends from the body the second distance.

4. The support assembly of claim 1, further comprising a second bearing assembly comprising a second ball bearing extending from the body the first distance;
   wherein the body further comprises a second sleeve; and
   wherein the second bearing assembly is coupled to the body within the second sleeve.

5. The support assembly of claim 4, wherein the second aperture is located between the first sleeve and the second sleeve such that the body is symmetrical.

6. The support assembly of claim 1, wherein the body is configured to be coupled to a structure;
wherein the support is configured to bear a load of the structure on a surface when the support extends from the body the second distance; and
wherein the first ball bearing is configured to bear the load of the structure on the surface when the support does not extend from the body the second distance.

7. The support assembly of claim 1, further comprising a coupling assembly coupled to the body, the coupling assembly configured to selectively receive a rail having a caster for supporting the support assembly above a surface.

8. The support assembly of claim 1, wherein the body further defines a first surface disposed along a first plane, a second surface disposed along the first plane, and a third surface disposed along a second plane;
wherein the third surface is contiguous with both the first surface and the second surface;
wherein the first plane is parallel to, and offset from, the second plane; and
wherein the first aperture is located on the third surface.

9. A support assembly comprising:
a body defining a first aperture and comprising a plate mount;
an insert positioned within the first aperture and defining a second aperture;
a plate coupled to the plate mount, the plate defining a third aperture aligned with the second aperture and a fourth aperture;
a first bearing assembly configured to be received in the fourth aperture;
a first fastener threadably engaged with the second aperture; and
a leg selectively repositionable within the third aperture, the leg comprising a fifth aperture and a support;
wherein the first fastener is configured to be positioned within the second aperture to threadably engage with the fourth aperture such that rotation of the first fastener causes repositioning of the leg within the third aperture.

10. The support assembly of claim 9, further comprising:
a first coupler coupled to the first bearing assembly and configured to be received in the fourth aperture; and
a first connector;
wherein the body further comprises a first projection extending from the body towards the plate; and
wherein the first connector is rotatably coupled to the first projection, the leg, and the first coupler such that repositioning of the leg within the third aperture causes corresponding repositioning of the first coupler within the fourth aperture.

11. The support assembly of claim 10, further comprising:
a second bearing assembly;
a second coupler coupled to the second bearing assembly; and
a second connector;
wherein the plate further defines a fifth aperture configured to receive the second coupler;
wherein the body further comprises a second projection extending from the body towards the plate; and
wherein the second connector is rotatably coupled to the second projection, the leg, and the second coupler such that repositioning of the leg within the third aperture causes corresponding repositioning of the second coupler within the fifth aperture.

12. The support assembly of claim 11, further comprising a second fastener extending through the leg, the second fastener rotatably coupled to the first connector and the second connector.

13. The support assembly of claim 9, wherein the insert comprises a first flange;
wherein the body comprises a second flange surrounding the first aperture;
wherein the insert is positioned within the first aperture such that the first flange interfaces with the second flange; and
wherein the first flange and the second flange cooperate to transfer force from the first fastener to the body.

14. The support assembly of claim 9, further comprising a coupling assembly coupled to the body, the coupling assembly configured to selectively receive a rail having a caster for supporting the support assembly above a surface.

15. A support assembly comprising:
a body comprising a first aperture centered on an axis;
a first bearing assembly comprising a first ball bearing;
a first fastener threadably engaged with the first aperture;
a leg selectively repositionable along the axis, the leg comprising a first portion, a second portion, a flange, and a support, the first portion contiguous with the support and the flange, the second portion contiguous with the flange; and
a bracket coupled to the body to receive the first portion of the leg;
wherein the first fastener is configured to cooperate with the leg to cause repositioning of the support relative to the body in response to rotation of the first fastener within the first aperture.

16. The support assembly of claim 15, wherein the first bearing assembly extends a first distance from the body and the support extends a second distance from the body;
wherein the support assembly is operable between a first position, where the first fastener is positioned such that the first distance is greater than the second distance, and a second position, where the first distance is less than the second distance; and
wherein the first bearing assembly is configured to facilitate movement of the support assembly on a surface when the support assembly is in the first position.

17. The support assembly of claim 15, wherein the body is configured to be coupled to a structure; and
wherein the support assembly is configured to selectively bear an entire load of the structure on the support.

18. The support assembly of claim 17, wherein the support assembly is configured to selectively bear the entire load of the structure independent of the support, the first bearing assembly bearing at least part of the entire load.

19. The support assembly of claim 15, further comprising a coupling assembly coupled to the body, the coupling assembly configured to selectively receive a rail having a caster for supporting the support assembly above a surface.

* * * * *